(12) United States Patent
Ueda et al.

(10) Patent No.: US 11,462,955 B2
(45) Date of Patent: Oct. 4, 2022

(54) ELECTRIC ROTATING MACHINE, ELECTRIC ROTATING MACHINE SYSTEM, VEHICLE, POWER GENERATOR, LIFTING DEVICE, AND ROBOT

(71) Applicant: KABUSHIKI KAISHA TOSHIBA, Minato-ku (JP)

(72) Inventors: Yasuhito Ueda, Yokohama (JP); Hiroshi Takahashi, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 252 days.

(21) Appl. No.: 16/555,510

(22) Filed: Aug. 29, 2019

(65) Prior Publication Data

US 2020/0295607 A1 Sep. 17, 2020

(30) Foreign Application Priority Data

Mar. 12, 2019 (JP) .............................. JP2019-044827

(51) Int. Cl.
| | |
|---|---|
| *H02K 1/08* | (2006.01) |
| *H02K 1/276* | (2022.01) |
| *H02K 21/14* | (2006.01) |
| *H02K 1/14* | (2006.01) |

(52) U.S. Cl.
CPC .............. *H02K 1/145* (2013.01); *H02K 1/08* (2013.01); *H02K 1/276* (2013.01)

(58) Field of Classification Search
CPC ............. H02K 1/08; H02K 21/14; H02K 1/27
USPC .............................. 310/254.1, 266, 267, 268
See application file for complete search history.

(56) References Cited

U.S. PATENT DOCUMENTS

| | | | |
|---|---|---|---|
| 4,237,396 A | 12/1980 | Blenkinsop et al. | |
| 6,531,799 B1 * | 3/2003 | Miller ................... | H02K 21/046 310/112 |
| 2006/0028085 A1 * | 2/2006 | Qu .......................... | H02K 19/20 310/178 |
| 2006/0284507 A1 * | 12/2006 | Murakami ........... | H02K 1/2793 310/156.37 |
| 2008/0179982 A1 * | 7/2008 | Kramer .................. | H02K 1/182 310/168 |

(Continued)

FOREIGN PATENT DOCUMENTS

| | | | |
|---|---|---|---|
| DE | 112006001089 T5 * | 3/2008 | ............. H02K 1/145 |
| JP | 59-220036 A | 12/1984 | |

(Continued)

*Primary Examiner* — Jose A Gonzalez Quinones
(74) *Attorney, Agent, or Firm* — Oblon, McClelland, Maier & Neustadt, L.L.P.

(57) ABSTRACT

An electric rotating machine according to an embodiment includes a stator, and a rotor that is rotatable about a rotational center. The stator includes a winding having an annular shape with the rotational center, a first core, and a second core. The first core surrounds a part of the winding, and has a pole face to which a magnetic flux is input in a first direction, and a pole face from which the magnetic flux is output in the first direction. The second core surrounds a part of the winding, and has a pole face to which a magnetic flux is input in a second direction, and a pole face from which the magnetic flux is output in the second direction. The rotor is positioned spaced from the first core and the second core, and is rotatable about the rotational center, relatively with respect to the stator.

13 Claims, 18 Drawing Sheets

(56) References Cited

U.S. PATENT DOCUMENTS

| | | |
|---|---|---|
| 2009/0243406 A1 | 10/2009 | Jack et al. |
| 2012/0249035 A1 | 10/2012 | Ueda |
| 2013/0147288 A1 | 6/2013 | Jack et al. |
| 2015/0084465 A1 | 3/2015 | Takahashi et al. |
| 2016/0276880 A1 | 9/2016 | Ueda et al. |
| 2016/0276881 A1 | 9/2016 | Takahashi et al. |
| 2017/0077792 A1 | 3/2017 | Ueda et al. |
| 2017/0267493 A1 | 9/2017 | Takahashi et al. |
| 2018/0166933 A1 | 6/2018 | Takahashi et al. |

FOREIGN PATENT DOCUMENTS

| | | |
|---|---|---|
| JP | 11-275847 A | 10/1999 |
| JP | 11-511948 A | 10/1999 |
| JP | 2007-509595 A | 4/2007 |
| JP | 2009-506738 A | 2/2009 |
| JP | 2009-201286 A | 9/2009 |
| JP | 2012-217312 A | 11/2012 |
| JP | 2015-61495 A | 3/2015 |
| JP | 5870072 B2 | 2/2016 |
| JP | 2016-178786 A | 10/2016 |
| JP | 2016-178820 A | 10/2016 |
| JP | 2017-60299 A | 3/2017 |
| JP | 2017-169343 A | 9/2017 |
| JP | 2018-98914 A | 6/2018 |
| JP | 2018-113785 A | 7/2018 |
| WO | WO 96/29774 A1 | 9/1996 |

* cited by examiner

ELECTRIC ROTATING MACHINE, ELECTRIC ROTATING MACHINE SYSTEM, VEHICLE, POWER GENERATOR, LIFTING DEVICE, AND ROBOT

CROSS-REFERENCE TO RELATED APPLICATIONS

This application is based upon and claims the benefit of priority from Japanese Patent Application No. 2019-044827, filed on Mar. 12, 2019; the entire contents of which are incorporated herein by reference.

FIELD

Embodiments described herein relate generally to an electric rotating machine, an electric rotating machine system, a vehicle, a power generator, a lifting device, and a robot.

BACKGROUND

One example of an electric rotating machine having been conventionally known is a transverse flux electric rotating machine.

It is beneficial if an electric rotating machine capable of generating a larger torque can be achieved.

DETAILED DESCRIPTION

Figure 1:
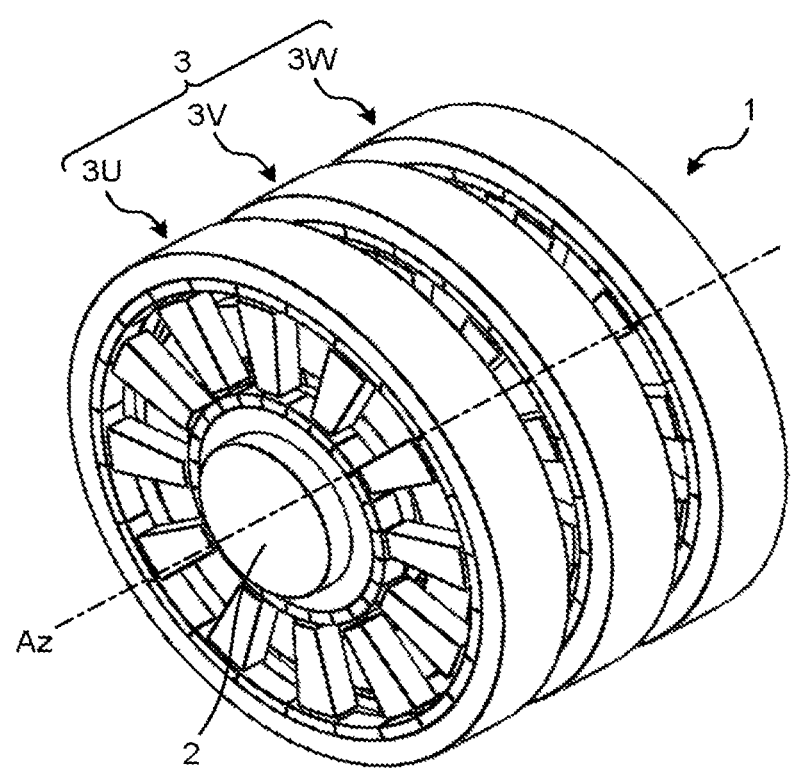
FIG. 1 is a perspective view illustrating one example of an electric rotating machine according to a first embodiment.

An electric rotating machine according to an embodiment includes a stator, and a rotor that is rotatable about a rotational center. The stator includes a winding having an annular shape with the rotational center, a first core, and a second core. The first core surrounds a part of the winding, and has a pole face to which a magnetic flux is input in a first direction, and a pole face from which the magnetic flux is output in the first direction. The second core surrounds a part of the winding, and has a pole face to which a magnetic flux is input in a second direction, and a pole face from which the magnetic flux is output in the second direction. The rotor is positioned spaced from the first core and the second core, and is rotatable about the rotational center, relatively with respect to the stator.

Hereinafter, some exemplary embodiments will be disclosed. The configurations (technological characteristics) according to the embodiment and the actions and results (effects) achieved by the configurations described below are provided by way of examples only. Furthermore, in the embodiments explained as some examples below, the same elements are included. In the explanation hereunder, the same elements are given the same reference numerals, and redundant explanations thereof will be omitted.

First Embodiment

Figure 2:
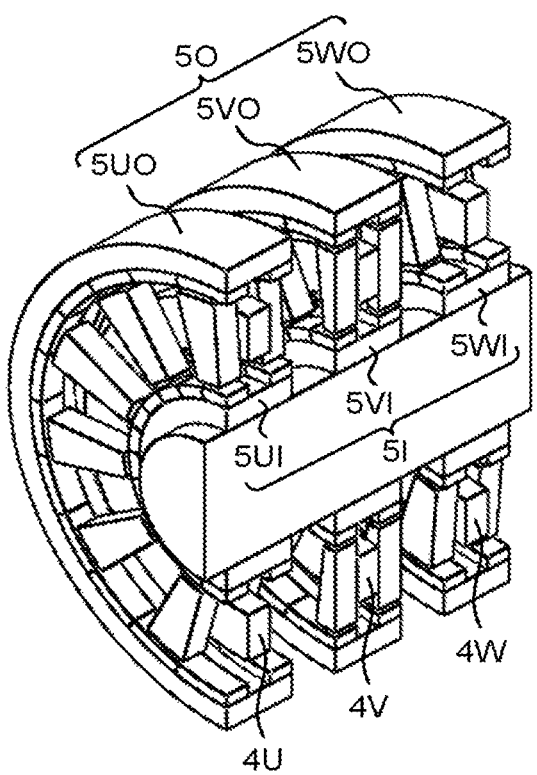
FIG. 2 is a perspective sectional view of the electric rotating machine according to the first embodiment, sectioned in a vertical direction.

FIG. 1 is a perspective view illustrating one example of an electric rotating machine 1 according to a first embodiment. FIG. 2 is a perspective sectional view of the electric rotating machine 1, sectioned in a vertical direction along the axial direction of a rotational center Az.

The electric rotating machine 1 according to the embodiment is a radial-gap, transverse flux electric rotating machine. The electric rotating machine 1 includes a shaft 2, and a plurality of (e.g., three) driving elements 3 (3U, 3V, 3W). The driving elements 3 are elements for driving the shaft 2 in rotation. The electric rotating machine 1 has a plurality of (e.g., three) phases, and the driving elements 3 correspond to the respective phases. The electric rotating machine 1 also includes a housing not illustrated. The housing not only houses the driving elements 3, but also rotatably supports the shaft 2. The electric rotating machine 1 functions as a motor or a generator.

As illustrated in FIG. 2, each of the driving elements 3 includes a stator 4 (4U, 4V, 4W) and a rotor 5. The rotor 5 includes a rotor 5I that is on the inner circumferential side in the radial direction, and a rotor 5O that is on the outer circumferential side. The rotor 5I includes rotors 5UI, 5VI, 5WI corresponding to three phases, respectively. The rotor 5O includes rotors 5UO, 5VO, 5WO corresponding to the three phases, respectively. In other words, the electric rotating machine 1 includes a plurality of (e.g., three) sets of the stator 4 and the rotor 5, with the sets being arranged in the axial direction. The stator 4 (4U, 4V, 4W) faces the rotors 5 on an inner circumferential surface and an outer circumferential surface (faces the rotors 5UI, 5VI, 5WI on the inner circumferential side, and faces the rotors 5UO, 5VO, 5WO on the outer circumferential side).

Driving Element

Figure 3:
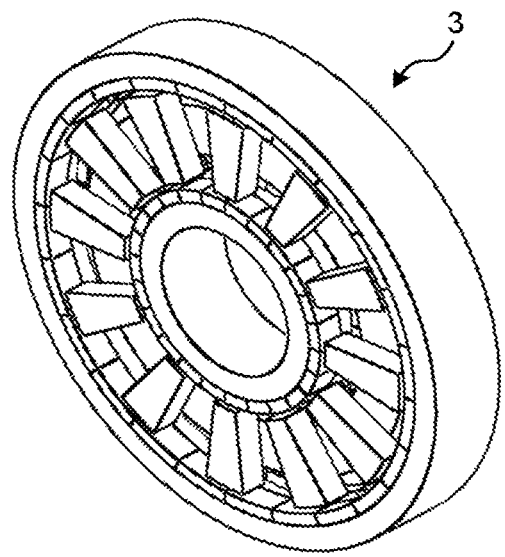
FIG. 3 is a perspective view illustrating one example of a driving element corresponding to one phase in the electric rotating machine according to the first embodiment.
Figure 4:
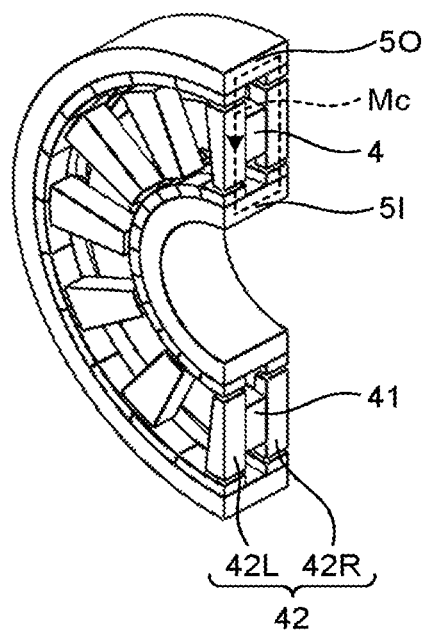
FIG. 4 is a cross-sectional view of a structure of the driving element corresponding to one phase according to the first embodiment.
Figure 5:
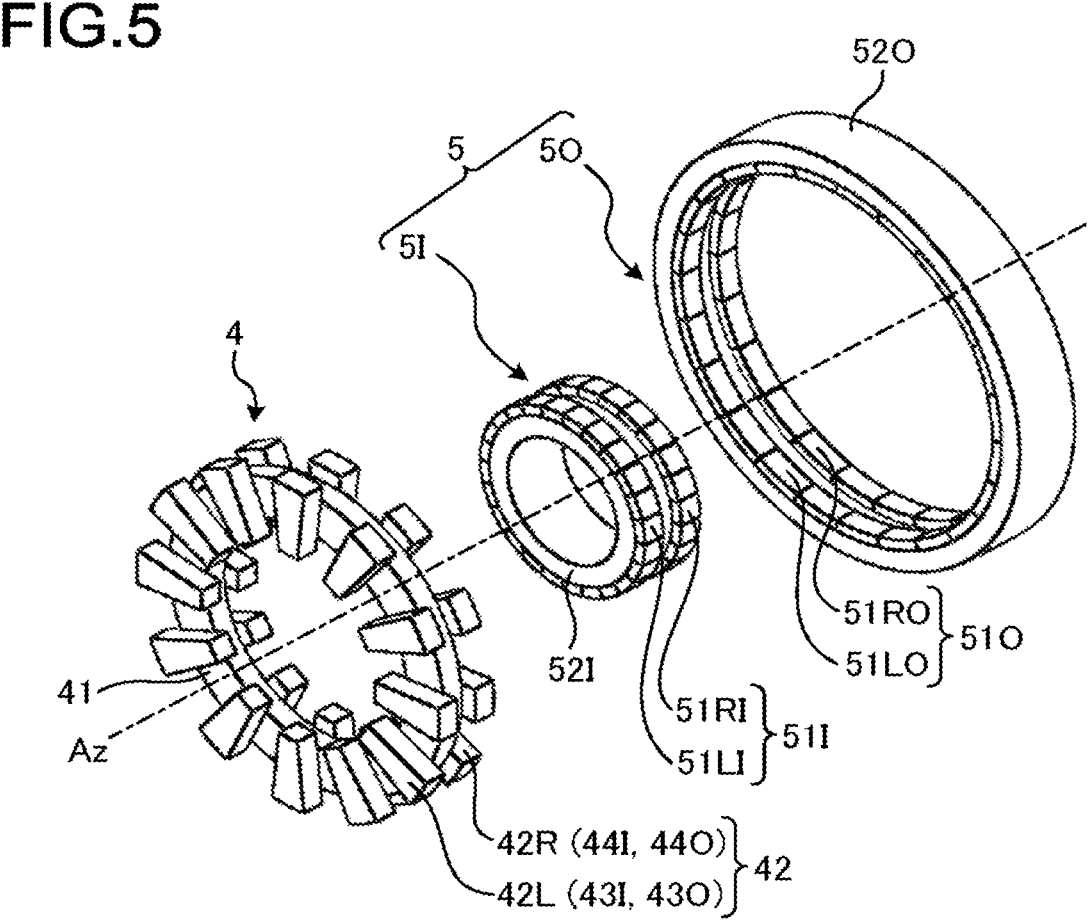
FIG. 5 is an exploded perspective view illustrating a plot of disassembled parts of the driving element according to the first embodiment.

FIG. 3 is a perspective view illustrating one example of the driving element 3 corresponding to one phase in the electric rotating machine 1. FIG. 4 is a sectional view of a structure of the driving element 3 corresponding to one phase. FIG. 5 is an exploded perspective view illustrating a plot of disassembled parts of the driving element 3 in the axial direction of the rotational center Az. The driving element 3 corresponding to one phase will now be explained more in detail.

Stator

As illustrated in FIG. 4, the stator 4 includes a winding 41 and a plurality of cores 42 (42L, 42R).

The winding 41 includes a conductor wire wound in an annular shape a plurality of number of times about the rotational center Az. The shape of the winding 41 is a ring-like shape extending along the circumferential direction (rotating direction) of the rotational center Az. The winding 41 may also be referred to as a stator winding.

The winding 41 is provided for each of the stators 4, that is, for each phase. AC power at phases different from one another is applied to the respective windings 41. In this embodiment, as an example, AC power with a phase difference of +120 degrees and −120 degrees with respect to those of the other two is applied to each of the three windings 41. The AC power applied to the windings 41 corresponding to the respective phases is not limited to this example.

The cores 42 (42L, 42R) are arranged along the circumferential direction, with a substantially constant space therebetween. The spaces between the cores 42 do not necessarily need to be constant, and may be set freely. The shape of the core 42 is, for example, an arc shape. The cores 42L and 42R surround the windings 41.

As illustrated in FIG. 4, the cores 42 include the cores 42L and the cores 42R. The cores 42L are positioned on one side of the axial direction (the front side in the axial direction of the rotational center Az), in a manner separated from the winding 41, and extend substantially in the radial directions (the radial directions of the rotational center Az). The cores 42R are positioned on the other side of the axial direction (the rear side in the axial direction of the rotational center Az), in a manner separated from the winding 41, and extend substantially in the radial directions.

As illustrated in FIG. 5, magnetic poles 43 (43I, 43O) are situated at the ends of the core 42L in the radial direction. Magnetic poles 44 (44I, 44O) are situated at the ends of the core 42R in the radial direction. In other words, the cores 42 surround the winding 41, in a manner spanning between the magnetic pole 43 and the magnetic pole 44. Each of these magnetic poles 43, 44 is a magnetic pole facing the corresponding rotor 5.

The cores 42L, 42R together make up a part of a magnetic circuit Mc, as will be described later. The core 42L has a pole face to which the magnetic flux is input in the first direction, and a pole face from which the magnetic flux is output in the first direction. The core 42R has a pole face to which the magnetic flux is input in the second direction, and a pole face from which the magnetic flux is output in the second direction. The second direction is a direction that is opposite to the first direction, for example.

In the manner described above, in this embodiment, because each pair of the core 42L and the core 42R has four pole faces, a larger torque can be generated.

In the example of the magnetic circuit Mc illustrated in FIG. 4, the core 42L has a pole face to which a magnetic flux is input in a direction travelling toward the inner circumferential side in the radial direction (one example of a first direction), and a pole face from which the magnetic flux is output in the direction travelling toward the inner circumferential side in the radial direction. The core 42R has a pole face to which a magnetic flux is input in a direction travelling toward the outer circumferential side in the radial direction (one example of a second direction), and a pole face from which the magnetic flux is output in the direction travelling toward the outer circumferential side in the radial direction. The core 42L is one example of a first core, and the core 42R is one example of a second core.

Rotor

As illustrated in FIG. 5, the rotor 5 includes the rotor 5I that is positioned on the inner circumferential side of the stator 4, and the rotor 5O that is positioned on the outer circumferential side. The rotor 5I includes a plurality of magnets 51I and a core 52I. The rotor 5O includes a plurality of magnets 51O and a core 52O. The rotor 5I and the rotor 5O are connected to each other with a coupling body not illustrated. The rotor 5I on the inner circumferential side is fixed to the shaft 2. In other words, the rotor 5 rotates about the rotational center Az, together with the shaft 2. In this manner, the rotor 5 is positioned in a manner spaced from the core 42L and the core 42R, and is rotatable about the rotational center Az, relatively with respect to the stator 4.

Hereinafter, when it is not necessary to distinguish the rotor 5I and the rotor 5O that are on the inner circumferential side and the outer circumferential side, respectively, the rotor 5I and the rotor 5O will be referred to as rotors 5. The magnets 51I and the magnets 51O are sometimes referred to as magnets 51, and the core 52I and the core 52O are sometimes referred to as cores 52.

The axis of the shaft 2 is matched with the rotational center Az. The shaft 2 has a cylindrical and rod-like shape, for example. The shaft 2 is made from a non-magnetic body, as an example. An insulation layer or an insulating interposition layer may be inserted between the shaft 2, and the magnets 51 and the cores 52. The shaft 2 can be said to be a part of the rotor 5.

The magnets 51 are permanent magnets, and are rare earth sintered magnets having a high maximum energy product, as an example. The shape of the magnet 51 is an arc shape, for example.

The core 52 is provided adjacently to the magnet 51 on one side in the radial direction. The shape of the core 52 is a ring-like shape extending along the circumferential direction, with the rotational center Az at the center.

The magnets 51I and 51O are both magnetized in the radial direction. Each of the magnets 51I includes a magnet 51LI and a magnet 51RI that are positioned separated from each other in the axial direction. Each of the magnets 51O includes a magnet 51LO and a magnet 51RO that are positioned separated from each other in the axial direction. The magnets 51LI and 51RI are positioned at a matching phase in the circumferential direction. The magnets 51LO and 51RO are positioned at a matching phase in the circumferential direction.

A magnet 51I and a magnet 51O positioned separated from each other in the radial direction are positioned at a matching phase in the circumferential direction. For example, the number of the magnets 51I is matched with the number of the magnets 51O, and each of the magnets 51I and the corresponding magnet 51O are arranged at a matching phase in the circumferential direction.

In this embodiment, as an example, two magnets 51 that are adjacent to each other in the axial direction, the radial direction, and the circumferential direction are magnetized in opposite directions (the directions of magnetization are opposite). For example, the magnet 51LI (LO) and the magnet 51RI (RO) that are adjacent in the axial direction are magnetized in the opposite directions with respect to each other. The magnet 51LI (RI) and the magnet 51LO (RO) that are adjacent in the radial direction are magnetized in the opposite directions with respect to each other. Two magnets 51LI (LO, RI, or RO) that are adjacent in the circumferential direction are magnetized in the opposite directions with respect to each other.

With such a configuration, the magnetic circuit Mc illustrated in FIG. 4 is formed in a manner spanning between the stator 4 and the rotor 5 at each phase, that is, between each of the cores 42 and the corresponding core 52 in each of the driving elements 3. The direction of the magnetic circuit Mc is determined based on a relation between the power applied to the winding 41, the direction in which the magnets 51 are magnetized, and the like. In the manner described above, in this embodiment, because four pole faces are formed for each of the magnetic circuit Mc, a larger torque can be generated.

Because there is one stator 4, the winding 41 can be wound in a manner concentrated at one location. In other words, the stator 4 can be achieved using a smaller amount of conductor wire. Therefore, a copper loss accrued in the winding 41 can be suppressed. In this embodiment, the electric rotating machine 1 is a radial-gap electric rotating machine in which the stator 4 and the rotor 5 face each other in the radial direction. Therefore, it is possible to increase the areas of the magnetic poles easily, and to generate a large torque, in an electric rotating machine that is long in the axial direction.

In the core 42, the magnetic flux flows in the radial direction. Therefore, the core 42 can be manufactured using a grain-oriented electrical steel sheet with an easy axis in the radial direction, for example. With a grain-oriented electrical steel sheet having an easy axis, the magnetic flux can be passed through the easy axis with a smaller loss.

Second Embodiment

Figure 6:
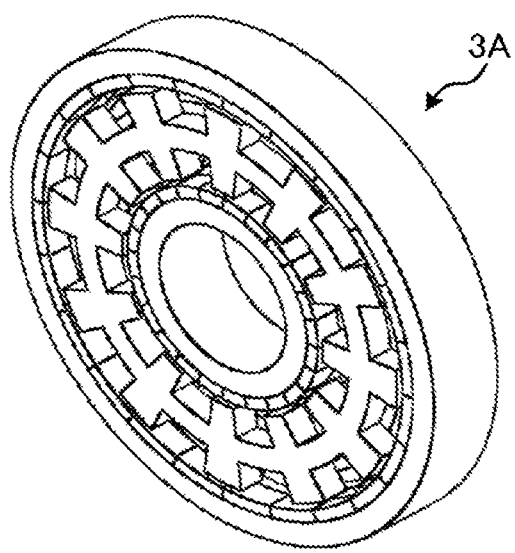
FIG. 6 is a perspective view illustrating one example of a driving element corresponding to one phase in an electric rotating machine according to a second embodiment.
Figure 7:
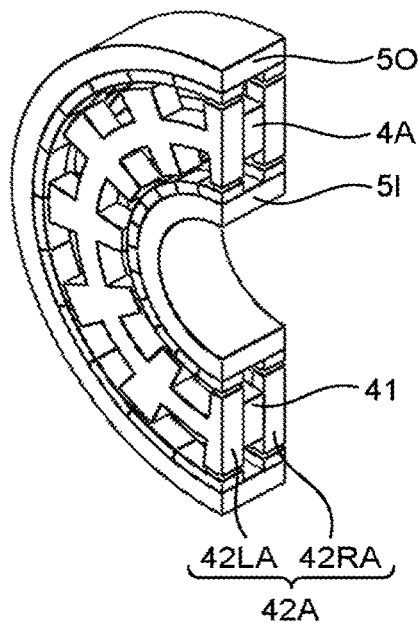
FIG. 7 is a cross-sectional view of a structure of the driving element corresponding to one phase according to the second embodiment.
Figure 8:
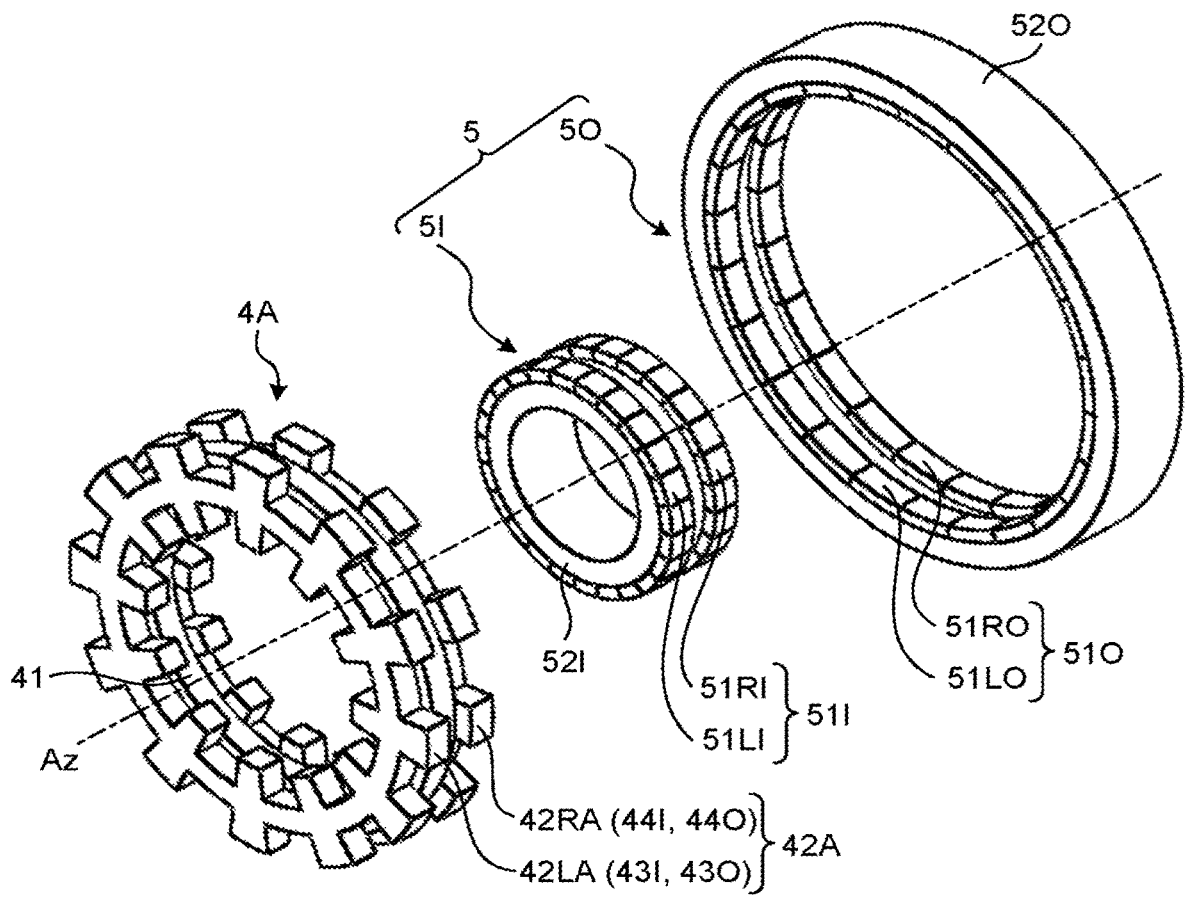
FIG. 8 is an exploded perspective view illustrating a plot of disassembled parts of the driving element according to the second embodiment.

FIG. 6 is a perspective view illustrating one example of a driving element 3A corresponding to one phase in an electric rotating machine according to a second embodiment. FIG. 7 is a sectional view of a structure of the driving element 3A corresponding to one phase. FIG. 8 is an exploded perspective view illustrating a plot of disassembled parts of the driving element 3A in the axial direction of the rotational center Az. The electric rotating machine according to this embodiment, too, is a radial-gap, transverse flux electric rotating machine, and can include three driving elements 3A, for example. In the description below, the driving element 3A corresponding to one phase according to this embodiment will be explained.

Because the rotor 5, and the winding 41 included in a stator 4A according to the embodiment are the same as those according to the first embodiment, the same reference numerals are assigned thereto, and explanations thereof will be omitted. In this embodiment, the structures of cores 42A (42LA, 42RA) included in the stator 4A are different from those of the cores 42 (42L, 42R) included in the stator 4 according to the first embodiment.

In this embodiment, the core 42A (42LA, 42RA) of the stator 4A has an annular portion and a plurality of projections. The annular portion has an annular shape with the rotational center Az at the center. The projections are projections protruding from the annular portion in the radial directions. The projections are arranged along the circumferential direction, with a substantially constant space therebetween. The projections correspond to the magnetic poles 43 (43I, 43O) and the magnetic poles 44 (44I, 44O) in the first embodiment.

With such a configuration, because the magnetic poles 43, 44 can be manufactured as an integration, the rigidity of the entire magnetic poles of the stator 4A can be improved. In the core 42A, too, the magnetic flux flows in the radial directions, but because the core 42A is an integration, the magnetic flux cannot be aligned simultaneously to the easy axes in the magnetic poles 43, 44. Furthermore, because the winding 41 is disposed adjacently to the core 42A, if a conductive material is used in the circumferential direction, an eddy current in a direction that is the same as that of the current in the winding 41 may be guided to the core 42A. Therefore, as an exemplary material of the core 42A, it is preferable to use a dust core that is electrically insulating in the circumferential direction, and that can be integrally formed. In other words, the core 42A may be a powder compact.

Third Embodiment

Figure 9:
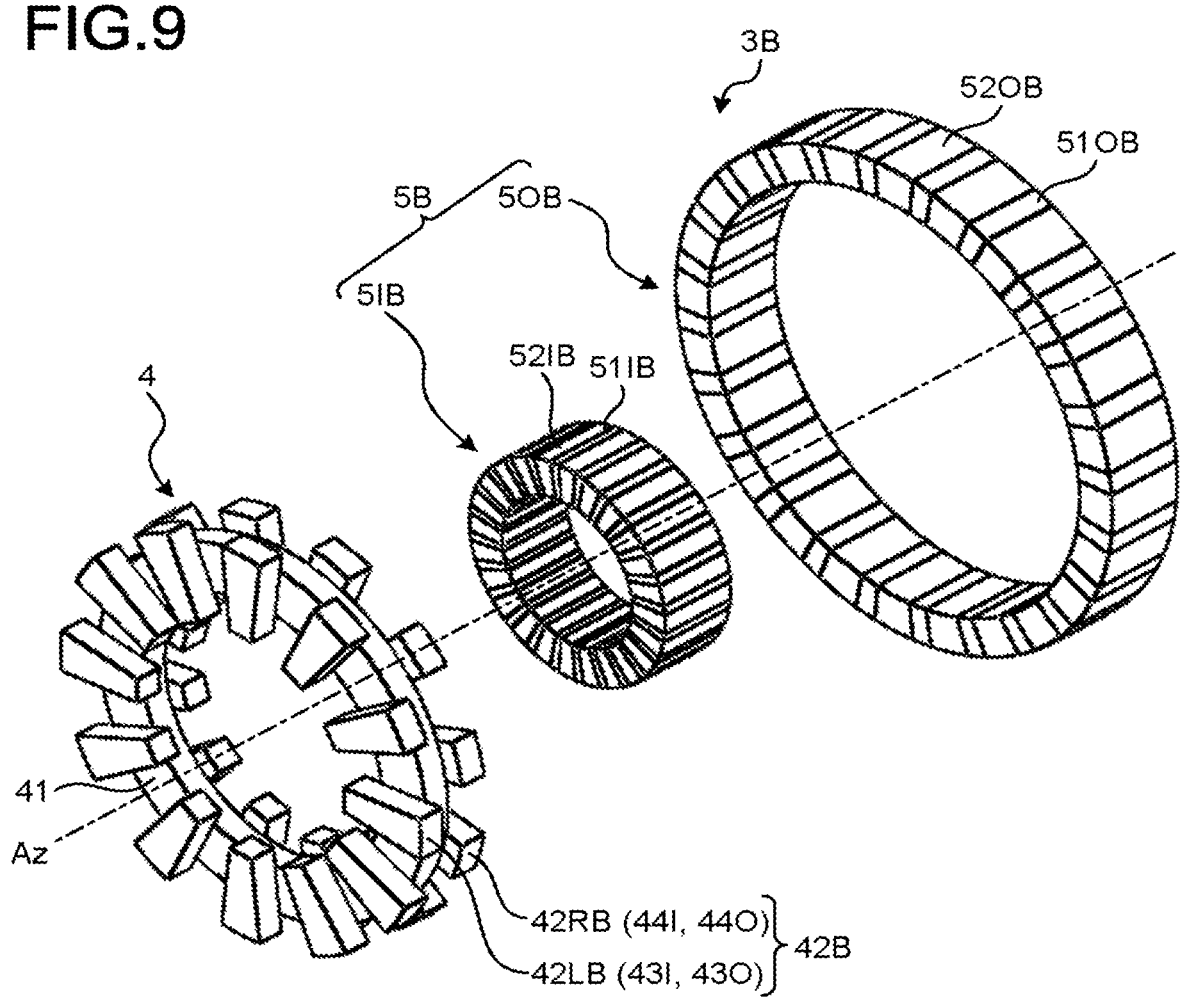
FIG. 9 is an exploded perspective view illustrating a plot of disassembled parts of the driving element according to a third embodiment.

FIG. 9 is an exploded perspective view illustrating a plot of disassembled parts of a driving element 3B corresponding to one phase in an electric rotating machine according to a third embodiment, in the axial direction of the rotational center Az. The electric rotating machine according to this embodiment, too, is a radial-gap, transverse flux electric rotating machine, and can include three driving elements 3B, for example. In the description below, the driving element 3B corresponding to one phase according to this embodiment will be explained.

In this embodiment, the structures of stator 4B, the core 42B (42LB, 42RB), magnets 51B, and cores 52B of a rotor 5B are different from those of the stator 4, the core 42 (42L, 42R), the magnets 51, and the cores 52 of the rotor 5 according to the first embodiment. In this embodiment, the magnets 51B are arranged alternatingly with the cores 52B in the circumferential direction in the rotor 5B. In this embodiment, as an example, the magnet 51B is magnetized in the circumferential direction, and the two magnets 51 that are adjacent in the circumferential direction are magnetized in the opposite directions with respect to each other.

In FIG. 9, the rotor 5IB on the inner circumferential side has the same phasic relation of the magnets 51B (51IB, 51OB) and the cores 52B (52IB, 52OB) in the circumferential direction, as that in the rotor 5OB on the outer circumferential side, but the embodiment is not limited thereto.

It is also possible to apply a rotor such as the rotor 5B illustrated in FIG. 9 to the second embodiment. In other words, the rotor 5 according to the second embodiment may be replaced with the rotor 5B illustrated in FIG. 9.

With such a configuration, larger magnets 51B can be disposed on the rotor 5B, and therefore, it is possible to provide the core 52B in which the magnetic flux can be conducted more easily to the position facing the stator 4. As a result, a larger torque can be generated.

Fourth Embodiment

Figure 10:
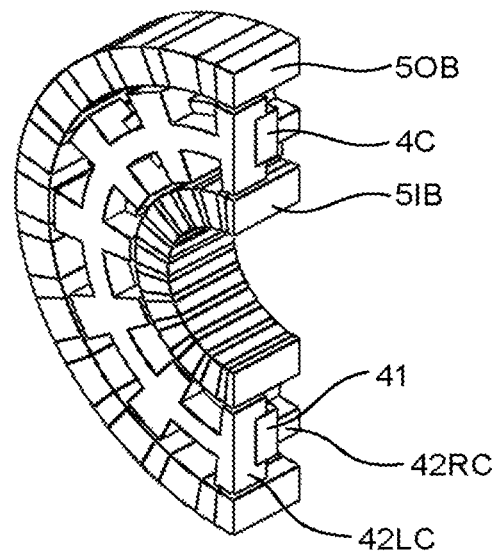
FIG. 10 is a cross-sectional view of a structure of a driving element corresponding to one phase in an electric rotating machine according to a fourth embodiment.
Figure 11:
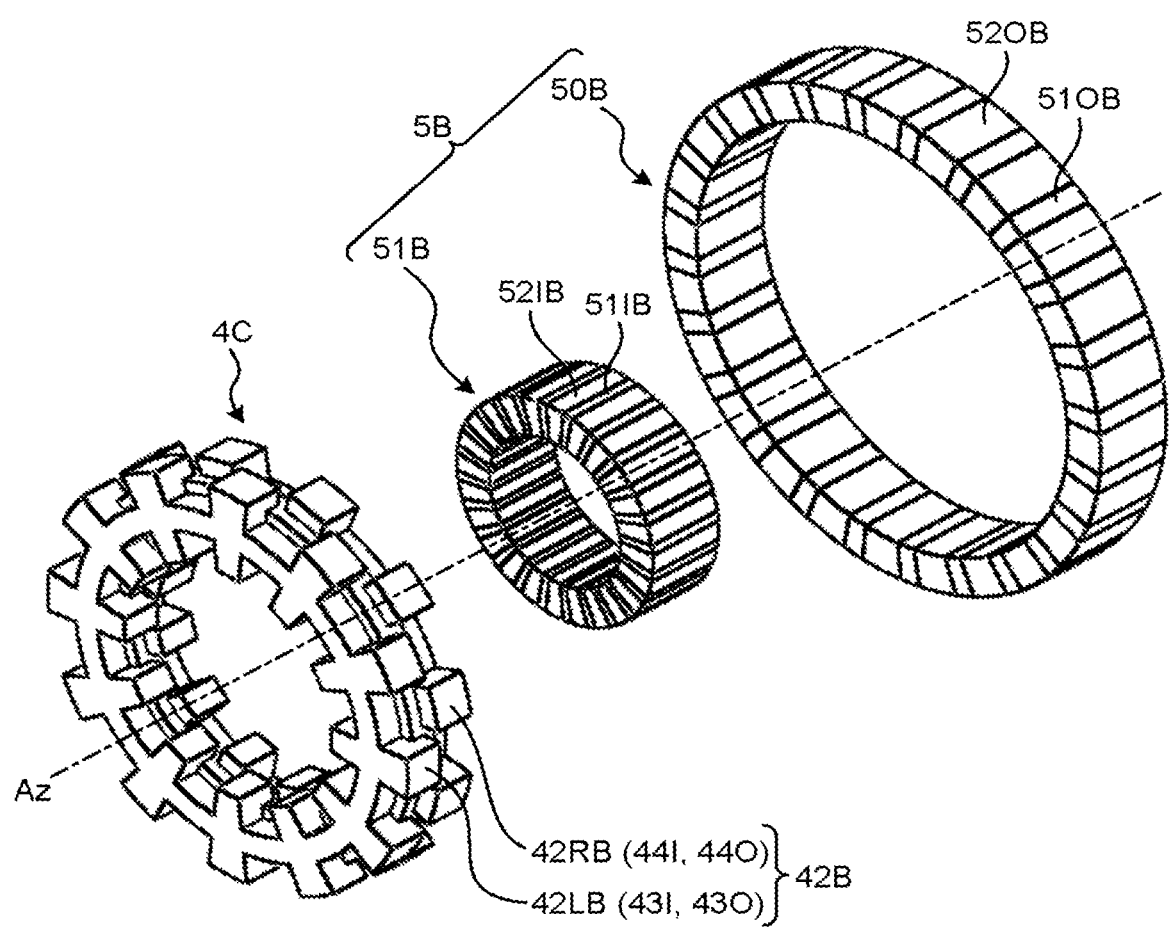
FIG. 11 is an exploded perspective view illustrating a plot of disassembled parts of the driving element according to the fourth embodiment.

FIG. 10 is a sectional view of a structure of a driving element 3C corresponding to one phase in an electric rotating machine according to a fourth embodiment. FIG. 11 is an exploded perspective view illustrating a plot of disassembled parts of a driving element 3C in the axial direction of the rotational center Az. The electric rotating machine according to this embodiment, too, is a radial-gap, transverse flux electric rotating machine, and can include three driving elements 3C, for example. In the description below, the driving element 3C corresponding to one phase according to this embodiment will be explained.

Because the rotor 5B according to this embodiment is the same as that according to the third embodiment, the same reference numeral is assigned thereto, and an explanation thereof will be omitted. In this embodiment, the structures of the stator 4C and the core 42RC, 42LC are different from those of the stator 4A and the core 42LA, 42RA according to the second embodiment. As illustrated in FIGS. 10 and 11, in the stator 4C according to the embodiment, the magnetic poles 43 (43I, 43O) and 44 (44I, 44O) are bent at a substantially right angle, at the ends thereof in the radial direction. In FIGS. 10 and 11, because the end on the inner circumferential side and the end on the outer circumferential side in the radial direction are both bent, the magnetic poles 43 and 44 are extended in the directions of the surfaces (the pole faces) facing the rotor 5B. It is also possible to configure only one of the end on the inner circumferential side and the end on the outer circumferential side to be bent.

By bending the ends of the magnetic poles 43 and 44, it is possible to increase the area by which the ends of the magnetic poles 43 and 44 face the rotor 5B, so that the torque can be increased.

Fifth Embodiment

Figure 12:
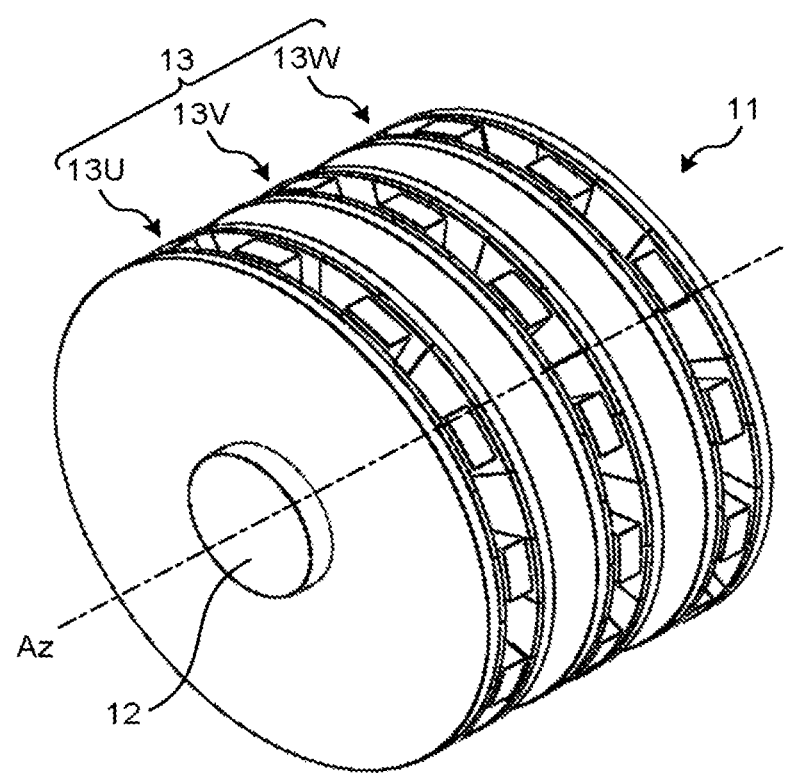
FIG. 12 is a perspective view illustrating one example of an electric rotating machine according to a fifth embodiment.
Figure 13:
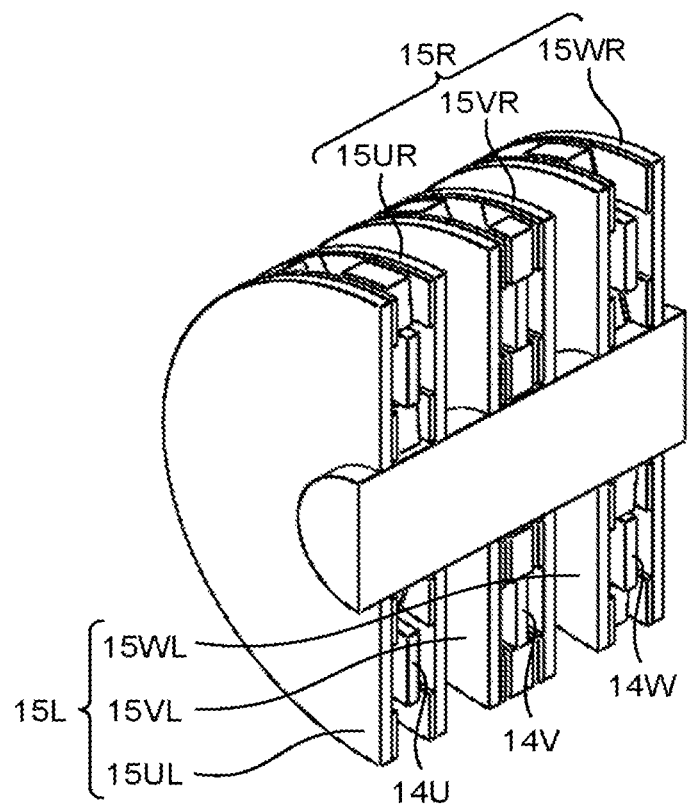
FIG. 13 is a perspective sectional view of the electric rotating machine according to the fifth embodiment, sectioned in the vertical direction.

FIG. 12 is a perspective view illustrating one example of an electric rotating machine 11 according to a fifth embodiment. FIG. 13 is a perspective sectional view of the electric rotating machine 11, sectioned in the vertical direction, along the axial direction of the rotational center Az. The electric rotating machine 11 according to this embodiment is an axial-gap, transverse flux electric rotating machine.

The electric rotating machine 11 includes a shaft 12, a plurality of (e.g., three) driving elements 13 (13U, 13V, 13W). The driving elements 13 are elements for driving the shaft 12 in rotation. The electric rotating machine 11 has a plurality of (e.g., three) phases, and the driving elements 13 correspond to the respective phases. The electric rotating machine 11 also includes a housing not illustrated. The housing not only houses the driving elements 13, but also rotatably supports the shaft 12. The electric rotating machine 11 functions as a motor or a generator.

As illustrated in FIG. 13, each of the driving elements 13 includes a stator 14 (14U, 14V, 14W) and a rotor 15. The rotor 15 includes a rotor 15L that is positioned on the front side in the axial direction, and a rotor 15R that is positioned on the rear side in the axial direction. The rotor 15L includes rotors 15UL, 15VL, 15WL corresponding to three phases, respectively. The rotor 15R includes rotors 15UR, 15VR, 15WR corresponding to three phases, respectively. In other words, the electric rotating machine 11 includes a plurality of (e.g., three) sets of the stator 14 and the rotor 15, with the sets being arranged in the axial direction. The stator 14 (14U, 14V, 14W) faces the rotors 15 in the front-and-back direction in the axial direction (faces the rotors 15UL, 15VL, 15WL on the front side in the axial direction (on the left side), and faces the rotors 15UR, 15VR, 15WR on the rear side in the axial direction (the right side)).

Driving Element

Figure 14:
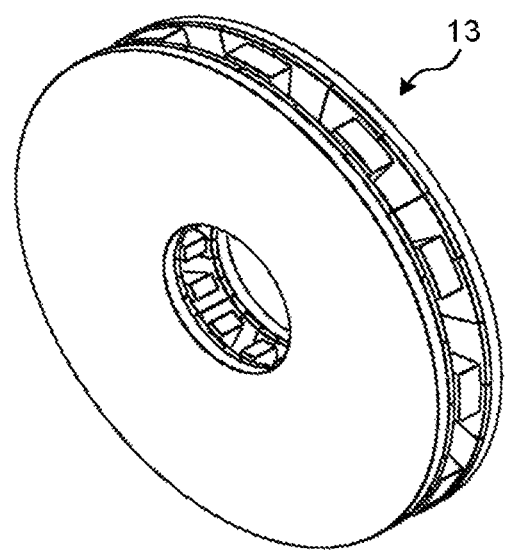
FIG. 14 is a perspective view illustrating one example of a driving element corresponding to one phase in the electric rotating machine according to the fifth embodiment.
Figure 15:
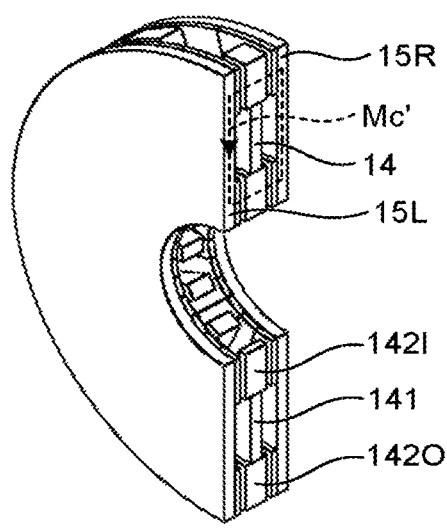
FIG. 15 is a cross-sectional view of a structure of the driving element corresponding to one phase according to the fifth embodiment.
Figure 16:
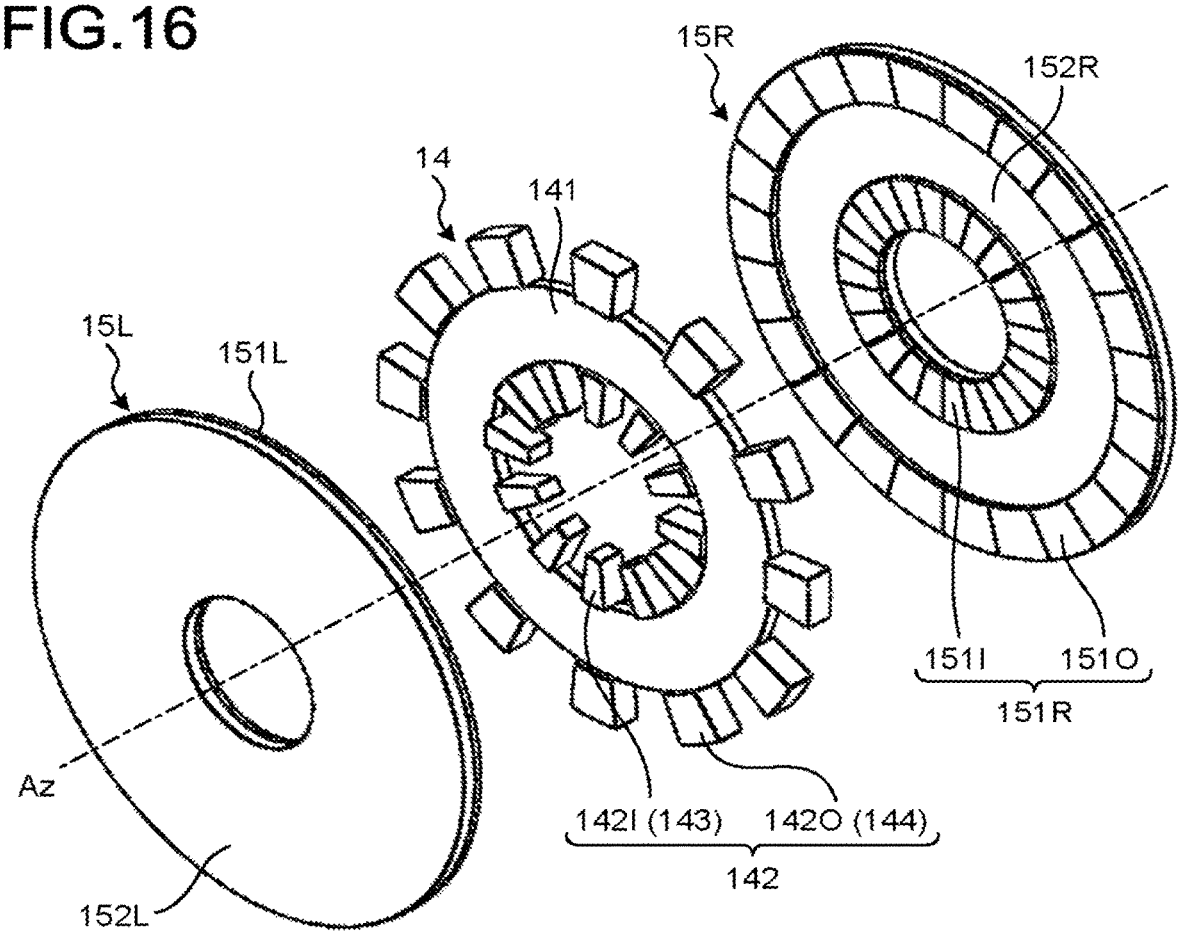
FIG. 16 is an exploded perspective view illustrating a plot of disassembled parts of the driving element according to the fifth embodiment.

FIG. 14 is a perspective view illustrating one example of a driving element 13 corresponding to one phase in the electric rotating machine 11. FIG. 15 is a sectional view of a structure of the driving element 13 corresponding to one phase. FIG. 16 is an exploded perspective view illustrating a plot of disassembled parts of the driving element 13 in the axial direction of the rotational center Az. The driving element 13 corresponding to one phase will now be explained in further detail.

Stator

As illustrated in FIG. 15, the stator 14 includes a winding 141 and a plurality of cores 142 (142I, 142O).

The winding 141 includes a conductor wire wound in an annular shape a plurality of number of times about the rotational center Az. The shape of the winding 141 is a ring-like shape extending along the circumferential direction (rotating direction) of the rotational center Az. The winding 141 may also be referred to as a stator winding.

The winding 141 is provided for each of the stators 14, that is, for each phase. AC power at phases different from one another is applied to the respective windings 141. In this embodiment, as an example, AC power with a phase difference of +120 degrees and −120 degrees with respect to those of the other two is applied to each of the three windings 141. The AC power applied to the windings 141 corresponding to the respective phases is not limited to this example.

The cores 142 (142I, 142O) are arranged along the circumferential direction, with a substantially constant space therebetween. The spaces between the cores 142 do not necessarily need to be constant, and may be set freely. The shape of the core 142 is, for example, an arc shape. The cores 142I and 142O surround the winding 141.

As illustrated in FIG. 16, the cores 142 include the cores 142I and the cores 142O. The cores 142I are positioned on one side of the radial direction (on the inner circumferential side), in a manner separated from the winding 141, and extends substantially in the radial directions. The cores 142O are positioned on the other side of the radial direction (outer circumferential side), in a manner separated from the winding 141, and extends substantially in the radial directions.

Magnetic poles 143 are situated at the ends of the core 142I in the axial direction. Magnetic poles 144 are situated at the ends of the core 142O in the axial direction. In other words, the cores 142 surround the winding 141, in a manner spanning between the magnetic pole 143 and the magnetic pole 144. These magnetic poles 143, 144 are magnetic poles facing the rotor 15.

The cores 142I, 142O make up a part of a magnetic circuit Mc', as will be described later. The core 142I has a pole face to which the magnetic flux is input in the first direction, and a pole face from which the magnetic flux is output in the first direction. The core 142O has a pole face to which the magnetic flux is input in the second direction, and a pole face from which the magnetic flux is output in the second direction. The second direction is a direction that is opposite to the first direction, for example.

In the manner described above, in this embodiment, because each pair of the cores 142I, 142O has four pole faces, a larger torque can be generated.

In the example of the magnetic circuit Mc' illustrated in FIG. 15, the core 142I has a pole face to which a magnetic flux is input in a direction travelling toward one side of the axial direction (toward the rear side in the axial direction of the rotational center Az) (one example of the first direction), and a pole face from which the magnetic flux is output in the direction travelling toward the one side of the axial direction. The core 142O has a pole face to which a magnetic flux is input in a direction travelling toward the other side in the axial direction (toward the front side in the axial direction of the rotational center Az) (one example of the second direction), and a pole face from which the magnetic flux is output in the direction travelling toward the other side in the axial direction. The core 142I is one example of the first core, and the core 142O is one example of the second core.

Rotor

As illustrated in FIG. 16, the rotor 15 includes the rotor 15L that is positioned on the front side of the stator 14 in the axial direction, and the rotor 15R that is positioned on the rear side. The rotor 15L includes a plurality of magnets 151L and a core 152L. The rotor 15R includes a plurality of magnets 151R and a core 152R. The rotors 15L and 15R are fixed to the shaft 12. In other words, the rotor 15 rotates about the rotational center Az, together with the shaft 12. In this manner, the rotor 15 is positioned in a manner spaced from the core 142L and the core 142R, and is rotatable about the rotational center Az, relatively with respect to the stator 14.

Hereinafter, when it is not necessary to distinguish the rotor 15L on the front side and the rotor 15R on the rear side of the axial direction, the rotor 15L and the rotor 15R will be referred to as rotors 15. The magnets 151L and the magnets 151R are sometimes referred to as magnets 151, and the core 152L and the core 152R are sometimes referred to as cores 152.

The axis of the shaft 12 is matched with the rotational center Az. The shaft 12 has a cylindrical and rod-like shape, for example. The shaft 12 is made from a non-magnetic body, as an example. An insulation layer or an insulating interposition layer may be inserted between the shaft 12, and the magnets 151 and the cores 152. The shaft 12 can be said to be a part of the rotor 15.

The magnets 151 are permanent magnets, and are rare earth sintered magnets having a high maximum energy product, as an example. The shape of the magnet 151 is an arc shape, for example.

The core 152 is provided adjacently to the magnets 151 on one side of the axial direction. The shape of the core 152 is a ring-like shape extending along the circumferential direction, with the rotational center Az at the center.

The magnets 151 are all magnetized in the axial direction. Each of the magnets 151 includes a magnet 151I and a magnet 151O that are positioned separated from each other in the radial direction. The magnets 151I and 151O are positioned at a matching phase in the circumferential direction.

The magnet 151L and the magnet 151R positioned separated from each other in the axial direction are positioned at a matching phase in the circumferential direction. For example, the number of the magnets 151L is matched with the number of the magnets 151R, and each of the magnets 151L and the corresponding magnet 151R are arranged at a matching phase in the circumferential direction.

In this embodiment, as an example, two magnets 151 that are adjacent to each other in the axial direction, the radial direction, or the circumferential direction are magnetized in opposite directions. For example, the magnet 151L and the magnet 151R that are adjacent in the axial direction are magnetized in the opposite directions with respect to each other. The magnet 151I and the magnet 151O that are adjacent in the radial direction are magnetized in the opposite directions with respect to each other. Two magnets 151I (151O) that are adjacent in the circumferential direction are magnetized in the opposite directions with respect to each other.

With such a configuration, the magnetic circuit Mc' illustrated in FIG. 15 is formed in a manner spanning between the stator 14 and the rotors 15 at each phase, that is, between the core 142 and the cores 152 in each of the driving element 13. The direction of the magnetic circuit Mc' is determined based on a relation between the power applied to the winding 141, the direction in which the magnets 151 are magnetized, and the like. In the manner described above, in this embodiment, because four pole faces are formed for each of the magnetic circuits Mc', a larger torque can be generated.

Because there is one stator 14, the winding 141 can be wound in a manner concentrated at one location. In other words, the stator 14 can be achieved using a smaller amount of conductor wire. Therefore, a copper loss accrued in the winding 141 can be suppressed. In this embodiment, the electric rotating machine is an axial-gap electric rotating machine in which the stator 14 and the rotor 15 face each other in the axial direction. Therefore, it is possible to increase the areas of the magnetic poles easily, and to generate a large torque, in an electric rotating machine having a large diameter.

In the core 142, the magnetic flux flows in the axial direction. Therefore, the core 142 can be manufactured using a grain-oriented electrical steel sheet with an easy axis in the axial direction, for example. In such a case, a cuboid-shape core 142 can be manufactured more easily, compared with an arc shape core. With a grain-oriented electrical steel sheet having an easy axis, the magnetic flux can be passed through the easy axis with a smaller loss.

Sixth Embodiment

Figure 17:
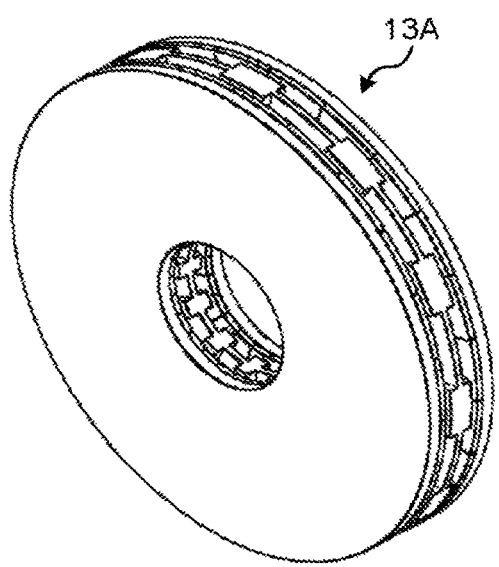
FIG. 17 is a perspective view illustrating one example of a driving element corresponding to one phase in an electric rotating machine according to a sixth embodiment.
Figure 18:
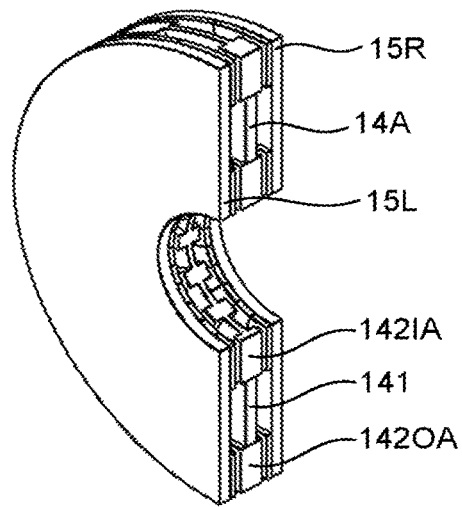
FIG. 18 is a cross-sectional view of a structure of the driving element corresponding to one phase according to the sixth embodiment.
Figure 19:
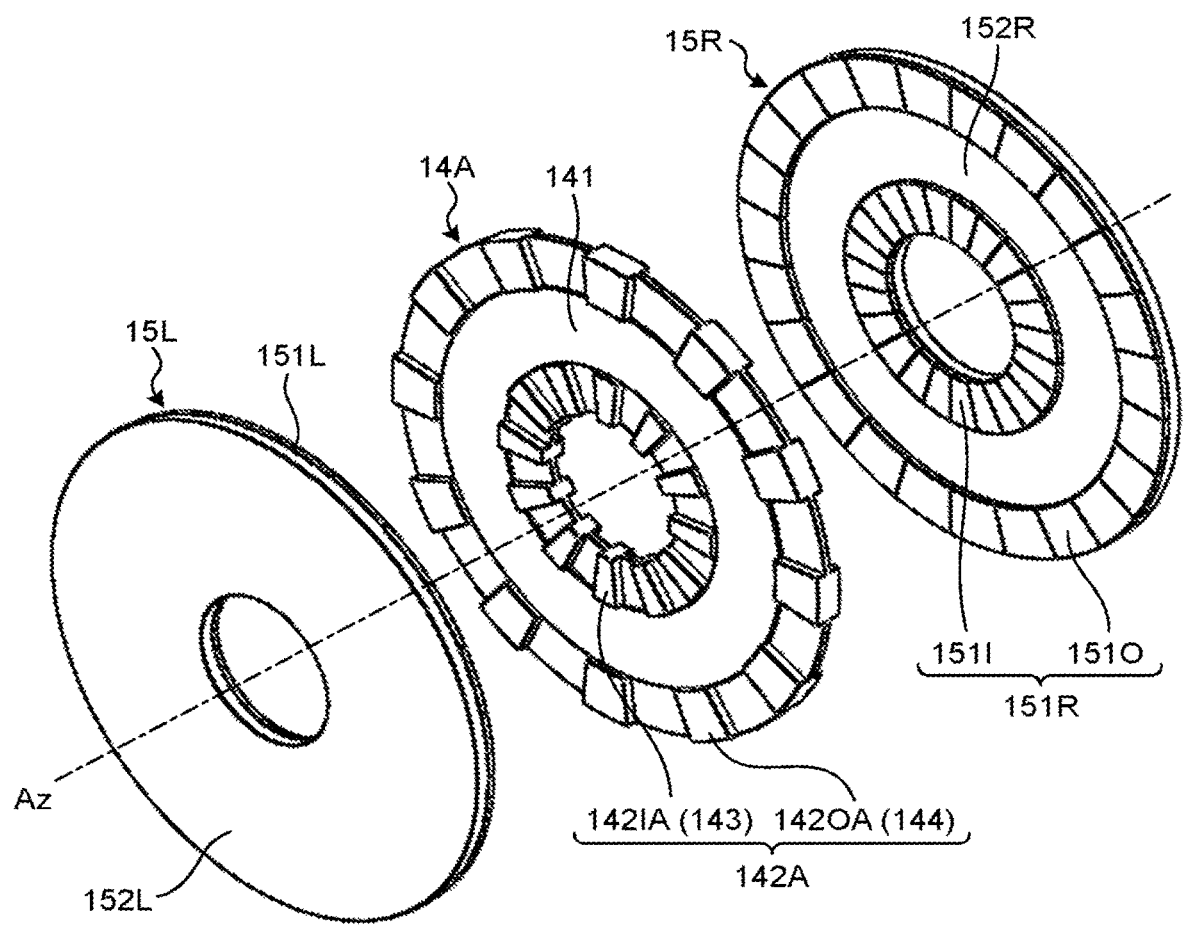
FIG. 19 is an exploded perspective view illustrating a plot of disassembled parts of the driving element according to the sixth embodiment.

FIG. 17 is a perspective view illustrating one example of driving element 13A corresponding to one phase in an electric rotating machine according to a sixth embodiment. FIG. 18 is a sectional view of a structure of the driving element 13A corresponding to one phase. FIG. 19 is an exploded perspective view illustrating a plot of disassembled parts of the driving element 13A in the axial direction of the rotational center Az. The electric rotating machine according to this embodiment, too, is an axial-gap, transverse flux electric rotating machine, and can include three driving elements 13A, for example. In the description below, the driving element 13A corresponding to one phase according to this embodiment will be explained.

Because the rotor 15, and the winding 141 included in a stator 14A according to the embodiment are the same as those according to the fifth embodiment, the same reference numerals are assigned thereto, and explanations thereof will be omitted. In this embodiment, the structure of cores 142A (142IA, 142OA) that are included in the stator 14A are different from those of the cores 142 (142I, 142O) included in the stator 14 according to the fifth embodiment.

In this embodiment, the core 142A (142IA, 142OA) included in the stator 14A has an annular portion and a plurality of projections. The annular portion has an annular shape with the rotational center Az at the center. The projections are projections protruding from the annular portion in the axial direction. The projections are configured to be arranged with a substantially constant space therebetween in the circumferential direction. The projections correspond to the magnetic poles 143 and the magnetic poles 144 in the fifth embodiment.

With such a configuration, because the magnetic poles 143, 144 can be manufactured as an integration, the rigidity of the entire magnetic poles of the stator 14A can be improved. Because the winding 141 is disposed adjacently to the core 142A, if a conductive material is used in the circumferential direction, an eddy current in a direction that is the same as that of the current in the winding 141 may be guided to the core 142A. Therefore, as an exemplary material of the core 142A, it is preferable to use a dust core that is electrically insulating in the circumferential direction, and that can be integrally formed. In the core 142A, too, the magnetic flux also flows in the axial direction. Therefore, by winding an electrical steel in the circumferential direction of the rotational center Az (in a spiral shape), the core 142A can be manufactured as an integration while ensuring an electric insulation in the circumferential direction. An electrical steel is preferable from the viewpoint of having a better mechanical strength and magnetic property, compared with a dust core. By using a grain-oriented electrical steel sheet with an easy axis in the axial direction, a better magnetic property can be achieved, and an internal loss in the core can be reduced.

Seventh Embodiment

Figure 20:
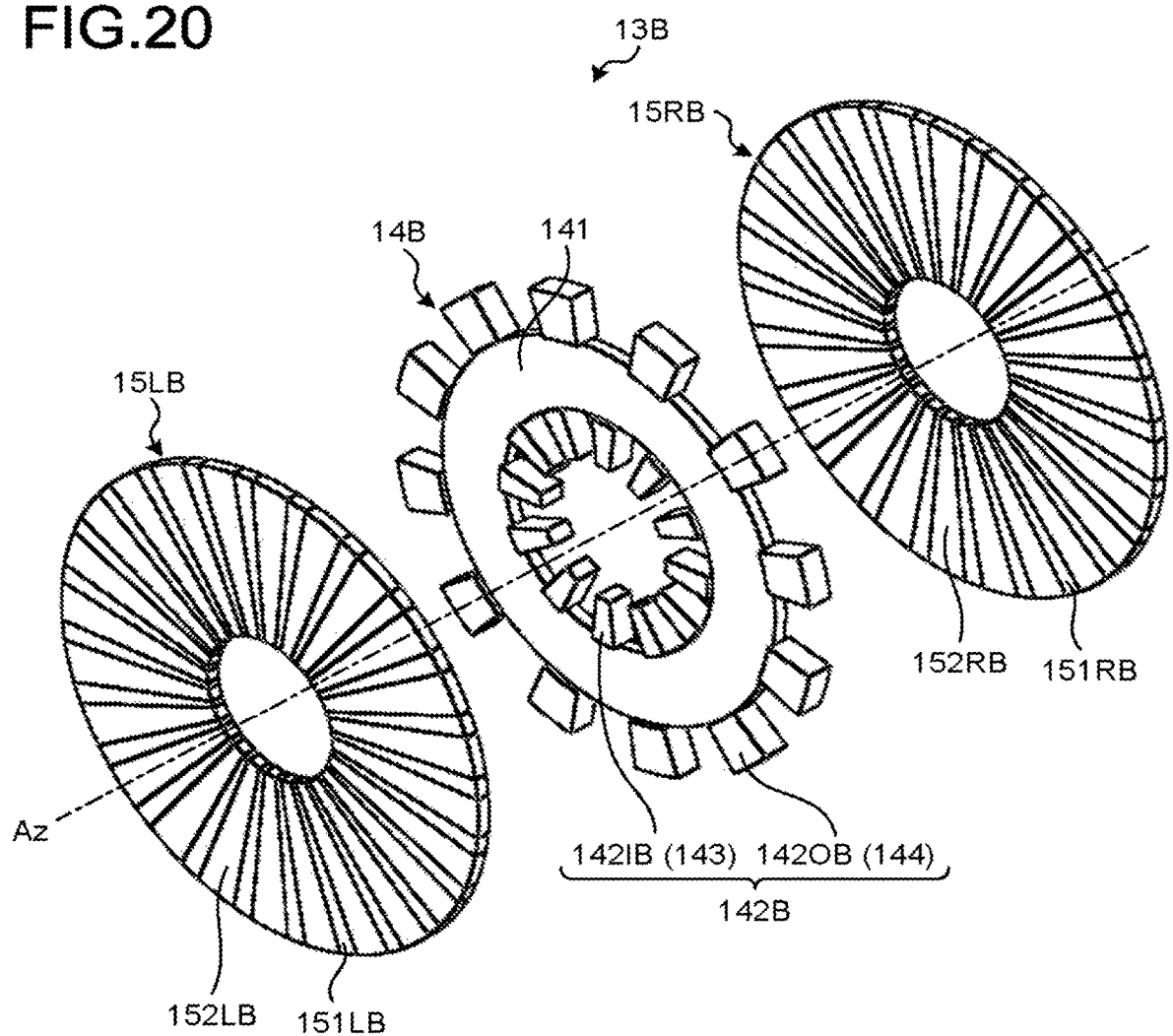
FIG. 20 is an exploded perspective view illustrating a plot of disassembled parts of a driving element according to a seventh embodiment.

FIG. 20 is an exploded perspective view illustrating a plot of disassembled parts of a driving element 13B corresponding to one phase in an electric rotating machine according to a seventh embodiment, in the axial direction of the rotational center Az. The electric rotating machine according to this embodiment, too, is an axial-gap, transverse flux electric rotating machine, and can include three driving elements 13B, for example. In the description below, the driving element 13B corresponding to one phase according to this embodiment will be explained.

In this embodiment, the structures of the stator 14B, the core 142B (142IB, 142OB), magnets 151B, and cores 152B included in a rotor 15B are different from those of the stator 14A, the core 142A (142IA, 142OA), the magnets 151, and the cores 152 included in the rotor 15 according to the sixth embodiment.

In this embodiment, the magnets 151B (151LB, 151RB) and the cores 152B (152LB, 152RB) included in the rotor 15B (15LB, 14RB) are arranged alternatingly in the circumferential direction. In this embodiment, as an example, the magnet 151B is magnetized in the circumferential direction, and the two magnets 151 that are adjacent in the circumferential direction are magnetized in the opposite directions with respect to each other.

In FIG. 20, the rotor 15LB on the front side in the axial direction has the same phasic relation of the magnets 151B and the cores 152B in the circumferential direction, as that in the rotor 15RB on the rear side of the axial direction, but the embodiment is not limited thereto.

It is also possible to apply a rotor such as the rotor 15B illustrated in FIG. 20 to the sixth embodiment. In other words, the rotor 15 according to the sixth embodiment may be replaced with the rotor 15B illustrated in FIG. 20.

With such a configuration, larger magnets 151B can be disposed on the rotor 15B, and therefore, it is possible to provide the core 152B in which the magnetic flux can be conducted more easily to the position facing the stator 14B. As a result, a larger torque can be generated.

Eighth Embodiment

Figure 21:
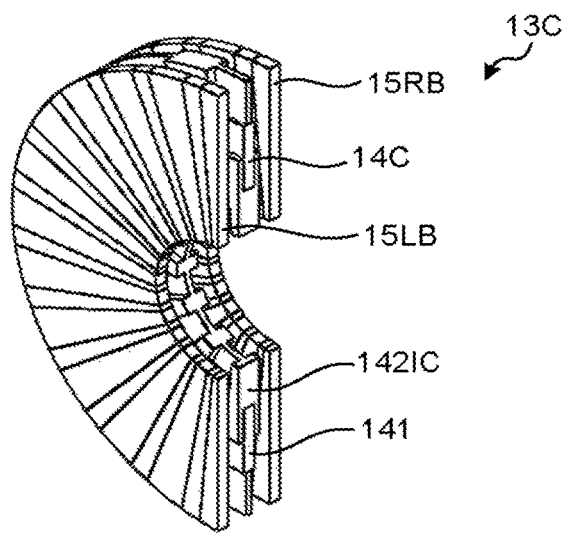
FIG. 21 is a cross-sectional view of a structure of a driving element corresponding to one phase in an electric rotating machine according to an eighth embodiment.
Figure 22:
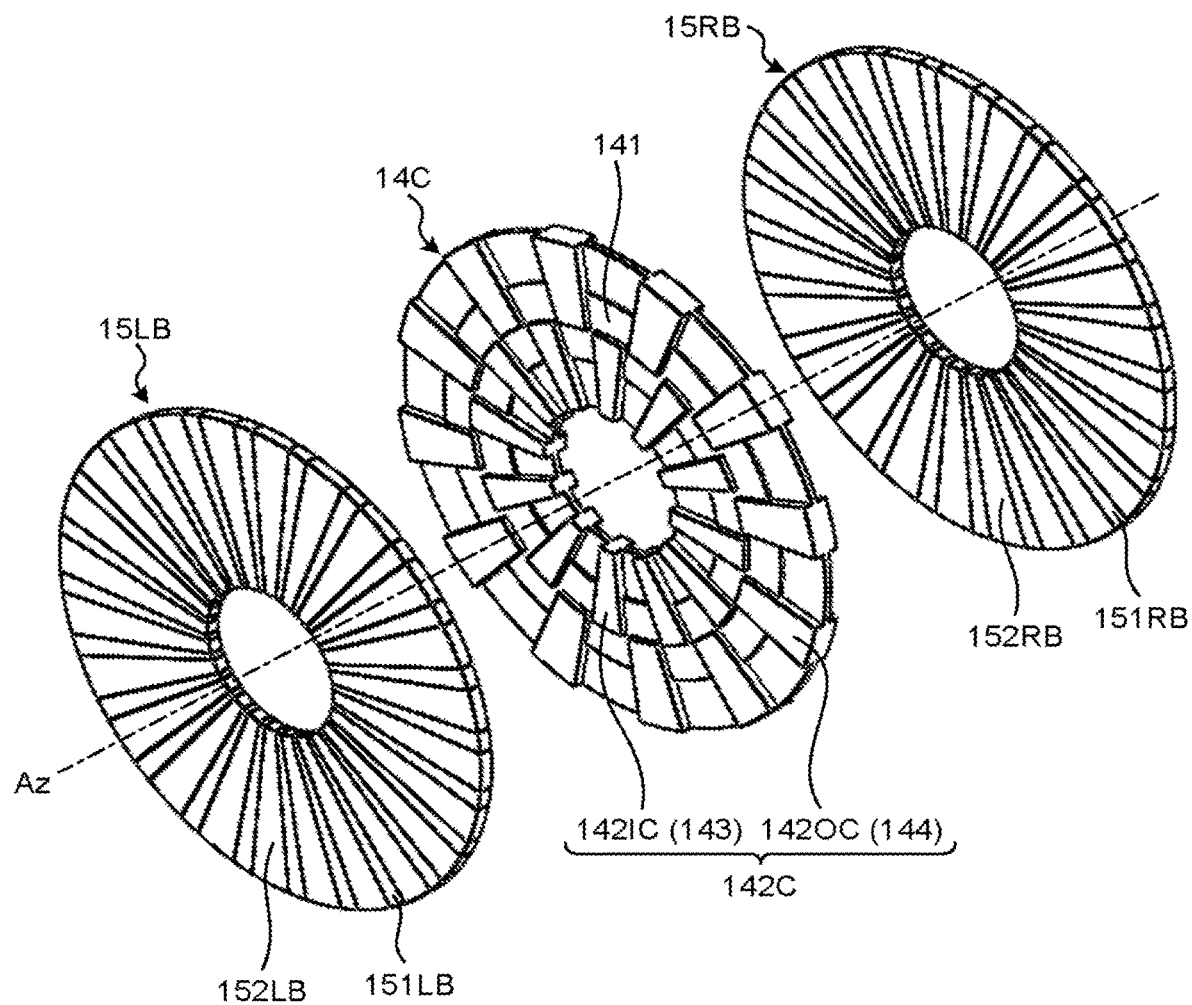
FIG. 22 is an exploded perspective view illustrating a plot of disassembled parts of the driving element according to the eighth embodiment.

FIG. 21 is a sectional view of a structure of a driving element 13C corresponding to one phase in an electric rotating machine according to an eighth embodiment. FIG. 22 is an exploded perspective view illustrating a plot of disassembled parts of the driving element 13C in the axial direction of the rotational center Az. The electric rotating machine according to this embodiment, too, is an axial-gap, transverse flux electric rotating machine, and can include three driving elements 13C, for example. In the description below, the driving element 13C corresponding to one phase according to this embodiment will be explained.

Because the rotor 15B according to this embodiment is the same as that according to the seventh embodiment, the same reference numeral is assigned thereto, and an explanation thereof will be omitted. In this embodiment, the structure of a stator 14C is different from that of the stator 14A according to the sixth embodiment. The stator 14C includes the winding 141 and a plurality of cores 142C (142IC, 142OC). As illustrated in FIGS. 21 and 22, in the stator 14C according to this embodiment, the ends of the magnetic poles 143 and 144 in the radial direction are extended in the radial direction. In other words, in the stator 14C, the magnetic poles 143 and 144 are extended in the direction of the surfaces (the pole faces) facing the rotor 15B. It is also possible to configure only one of the magnetic pole 143 and the magnetic pole 144 to be extended. Furthermore, the outer circumferential side of the magnetic pole 143 in the radial direction is extended, but it is also possible for the inner circumferential side to be extended. Furthermore, the inner circumferential side of the magnetic pole 144 in the radial direction is extended, but it is also possible for the outer circumferential side to be extended.

In this manner, by extending the magnetic poles 143 and 144, the areas of the ends of the magnetic poles 143 and 144 facing the rotor 15B can be increased, so that the torque can be increased.

Ninth Embodiment

Figure 23:
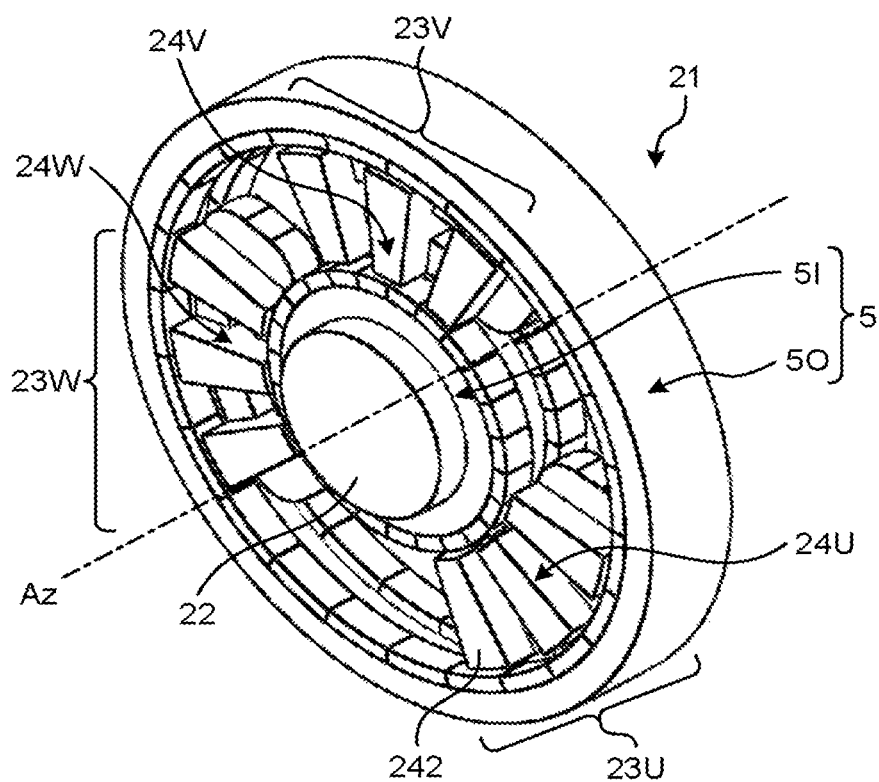
FIG. 23 is a perspective view illustrating one example of an electric rotating machine according to a ninth embodiment.
Figure 24:
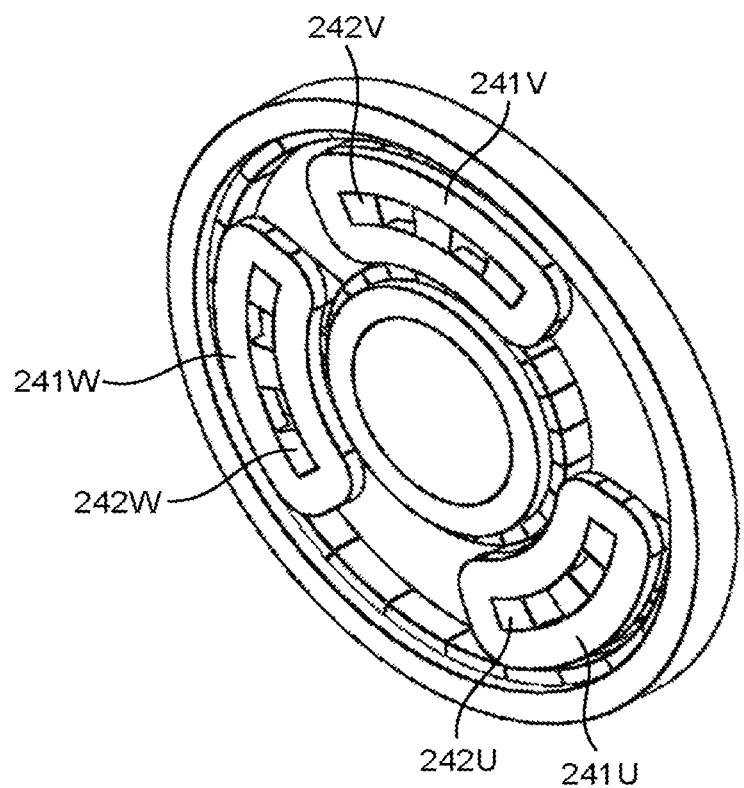
FIG. 24 is a perspective sectional view of the electric rotating machine according to the ninth embodiment.

FIG. 23 is a perspective view illustrating one example of an electric rotating machine 21 according to a ninth embodiment. FIG. 24 is a perspective sectional view of the electric rotating machine 21 sectioned across a plane perpendicular to the axial direction of the rotational center Az, and passing through the center of the width of the electric rotating machine 21 in the axial direction. The electric rotating machine 21 according to this embodiment is a radial-gap, transverse flux electric rotating machine.

The electric rotating machine 21 includes a shaft 22 and a plurality of (e.g., three) driving elements 23 (23U, 23V, 23W). The driving element 23 are elements for driving the shaft 22 in rotation. The electric rotating machine 21 has a plurality of (e.g., three) phases, and the driving elements 23 correspond to the respective phases. The electric rotating machine 21 also includes a housing not illustrated. The housing not only houses the driving elements 23, but also rotatably supports the shaft 22. The electric rotating machine 21 functions as a motor or a generator.

As illustrated in FIG. 23, each of the driving elements 23 includes a stator 24 (24U, 24V, 24W) and a rotor 5 (5I, 5O). In other words, the electric rotating machine 21 includes a plurality of (e.g., three) stators 24 (24U, 24V, 24W) that are arranged in the circumferential direction, and two rotors 5 (5I, 5O). The stator 24 (24U, 24V, 24W) faces the rotors 5 on the inner circumferential surface and the outer circumferential surface (faces the rotor 5I on the inner circumferential side, and faces the rotor 5O on the outer circumferential side). Because the rotors 5 according to this embodiment are the same as those according to the first embodiment, the same reference numerals are assigned thereto, and explanations thereof will be omitted.

Stator

As illustrated in FIG. 24, the stator 24 (24U, 24V, 24W) includes a winding 241 (241U, 241V, 241W) and a core 242 (242U, 242V, 242W). Because FIG. 24 is a cross-sectional view, only the rear core 242 in the axial direction is illustrated, but the core 242 is also provided on the front side in the axial direction. The cores 242 on the front and the rear side in the axial direction are one example of the first core and the second core.

The winding 241 (241U, 241V, 241W) includes a conductor wire wound around the entire corresponding core 242 (242U, 242V, 242W). The shape of the winding 241 is a substantially arc shape, for example. The winding 241 may also be referred to as a stator winding.

The winding 241 is provided for each of the stators 24, that is, for each phase. AC power at phases different from one another is applied to the respective windings 241. In this embodiment, as an example, AC power with a phase difference of +120 degrees and −120 degrees with respect to those of the other two is applied to each of the three windings 241. The AC power applied to the windings 241 corresponding to the respective phases is not limited to this example.

The cores 242U, 242V, 242W are arranged along the circumferential direction, with a substantially constant space therebetween. The spaces between the cores 242 (242U, 242V, 242W) do not necessarily need to be constant, and may be set freely. The phase differences between the one core 242U and the other two cores (242V and 242W) are electrical angles of +120 degrees and −120 degrees. The shape of the core 242 is, for example, an arc shape.

With such a configuration, a magnetic circuit is formed in a manner spanning between the stator 24 and the rotor 5, in each of the cores 242, 52 of the driving element 23. Because four pole faces are provided for each of the magnetic circuits, in the same manner as in the embodiments described above, a larger torque can be generated.

Tenth Embodiment

Figure 25:
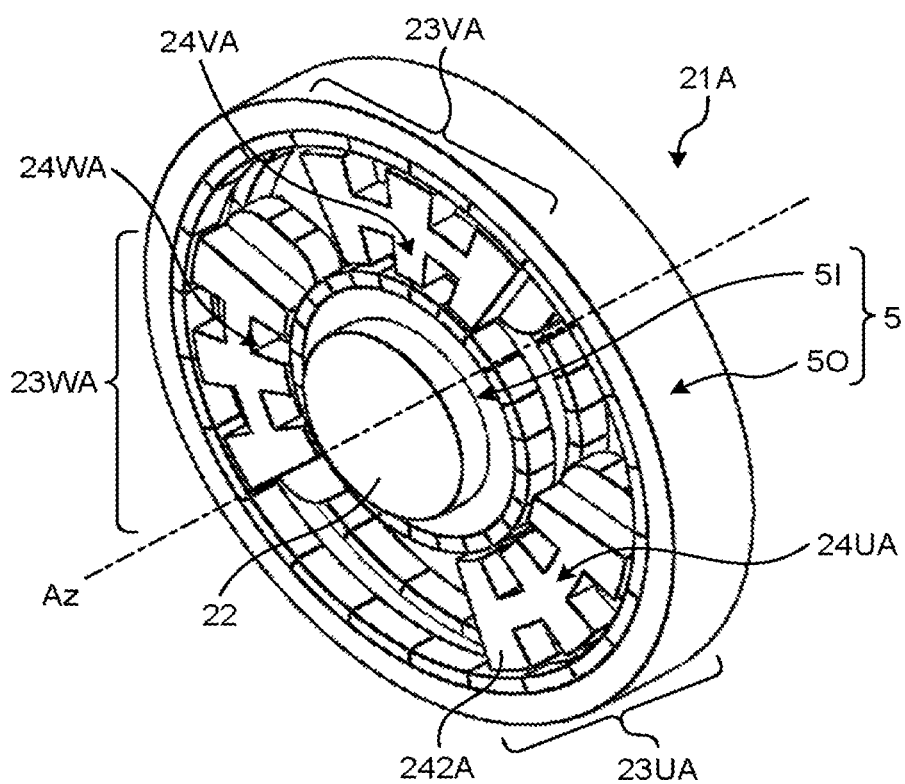
FIG. 25 is a perspective view illustrating one example of an electric rotating machine according to a tenth embodiment.
Figure 26:
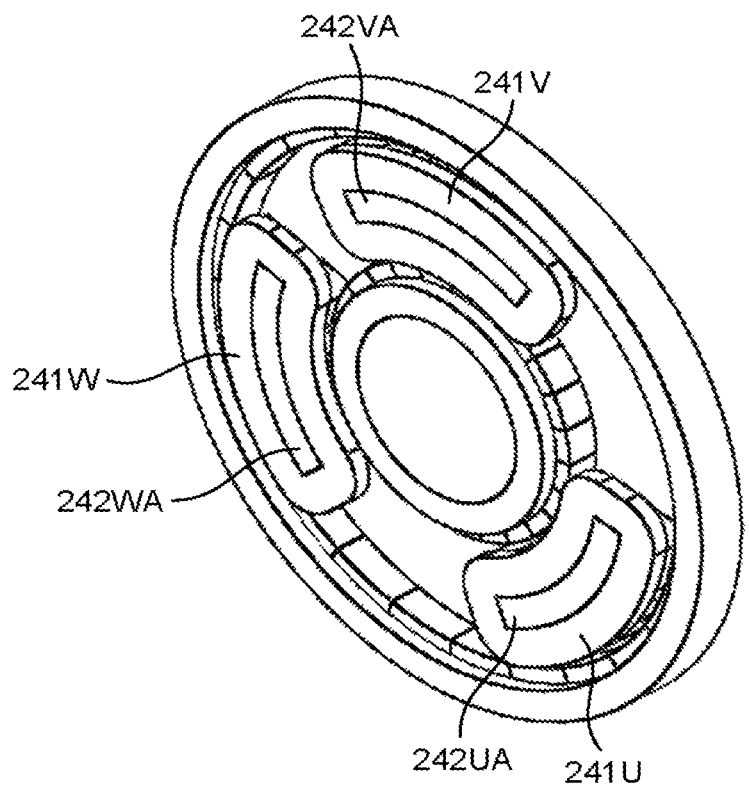
FIG. 26 is a perspective sectional view of the electric rotating machine according to the tenth embodiment.

FIG. 25 is a perspective view illustrating one example of an electric rotating machine 21A according to a tenth embodiment. FIG. 26 is a perspective sectional view of the electric rotating machine 21A sectioned across a plane perpendicular to the axial direction of the rotational center Az, and passing through the center of the width of the electric rotating machine 21A in the axial direction. The electric rotating machine 21A according to this embodiment is a radial-gap, transverse flux electric rotating machine.

The electric rotating machine 21A includes the shaft 22 and a plurality of (e.g., three) driving elements 23A (23UA, 23VA, 23WA). Because the rotor 5 according to this embodiment is the same as the rotor 5 according to the first embodiment, the same reference numeral is assigned thereto, and an explanation thereof will be omitted. In this embodiment, the structures of cores 242A included in a stator 24A are different from those of the cores 242 included in the stator 24 according to the ninth embodiment. In this embodiment, the cores 242A (242UA, 242VA, 242WA) included in the stators 24A (24UA, 24VA, 24WA) are connected in a substantially arc shape, in units of each phase.

With such a configuration, because each of the cores 242UA, 242VA, 242WA can be manufactured as an integration, the rigidity of the entire magnetic poles of the stator 24A can be improved.

It is possible to install the electric rotating machines according to the embodiments in robots in general, machines in general, electric machines, transportation machines, precision machines, and the like.

Some application examples in an electric rotating machine system, a vehicle (e.g., an automobile or a train car), a power generator (e.g., a wind power generator), a lifting device (e.g., an elevator or a crane), and a robot will now be explained. In the description below, application examples of the electric rotating machine 1 according to the first embodiment will be explained, but it is also possible to apply the electric rotating machine according to the other embodiments.

Electric Rotating Machine System

Figure 27:
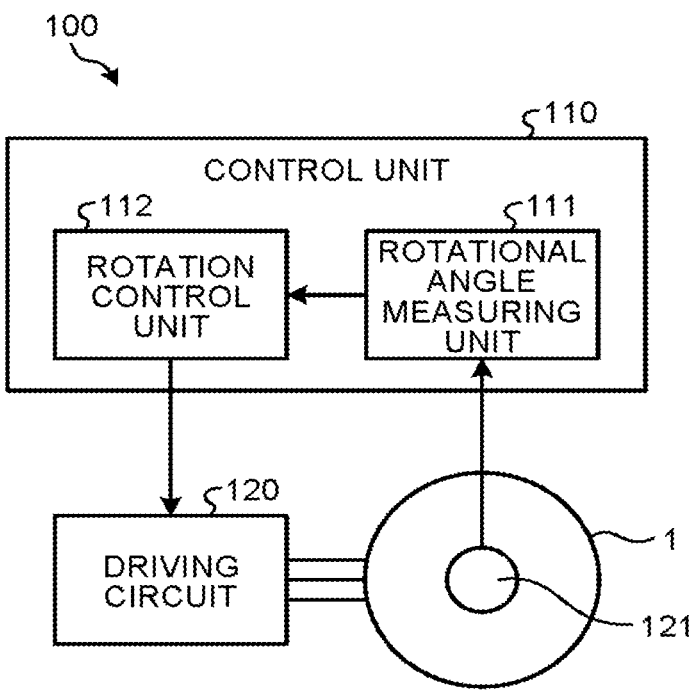
FIG. 27 is a block diagram of an electric rotating machine system including the electric rotating machine according to the embodiment.

FIG. 27 is a block diagram illustrating one exemplary configuration of an electric rotating machine system 100 including the electric rotating machine 1. As illustrated in FIG. 27, the electric rotating machine system 100 includes a driving circuit 120, an angle sensor 121, and a control unit 110.

The driving circuit 120 supplies power to the electric rotating machine 1, under the control of the control unit 110. The driving circuit 120 is provided with a battery, for example, as a power supply source (power source).

The angle sensor 121 includes a rotary encoder, for example, and detects the rotational angle of the rotor 5 in the electric rotating machine 1. Instead of detecting the rotational angle of the rotor 5 with the angle sensor 121, the rotational angle may also be estimated based on the power output from the driving circuit 120, which will be described later, and on a physical model of the electric rotating machine 1. Such an estimation may also be referred to as a sensorless position estimation.

The control unit 110 controls the operations of the driving circuit 120. The control unit 110 includes a rotational angle measuring unit 111 and a rotation control unit 112. The rotational angle measuring unit 111 outputs rotational angle information based on a detection result of the angle sensor 121. The rotation control unit 112 obtains a command value in accordance with a predetermined algorithm, based on the rotational angle information, on a required value received from the external, and the like, and controls the driving circuit 120 to apply power that is based on the command value to the electric rotating machine 1. The control unit 110 can perform an angle feedback control of the electric rotating machine 1 based on the detection result from the angle sensor 121 or on the sensorless position estimation.

Application Example in Vehicle

Figure 28:
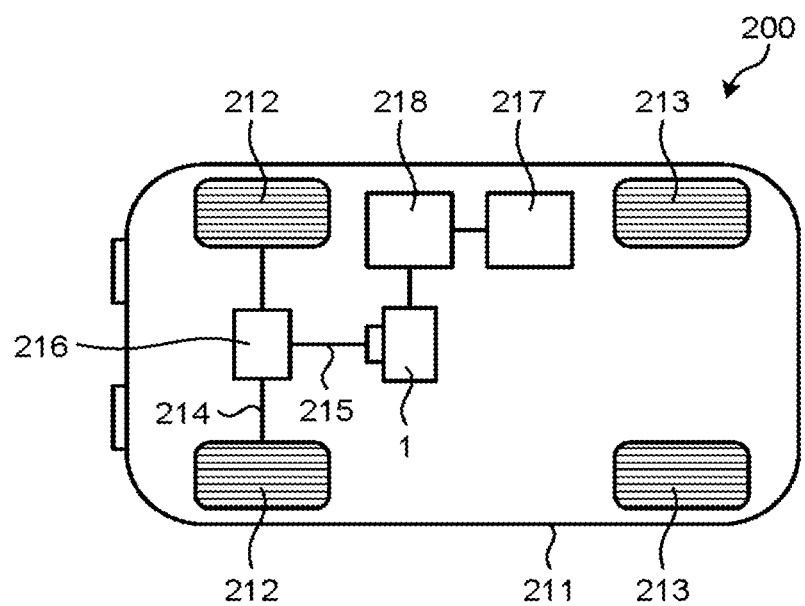
FIG. 28 is a general schematic of a structure of a vehicle including the electric rotating machine according to the embodiment.

FIG. 28 is a general schematic of a structure of a vehicle 200 including the electric rotating machine 1. The vehicle 200 (machine) may include the electric rotating machine 1 according to the first embodiment. In the example illustrated in FIG. 28, the vehicle 200 is what is called a hybrid car. A body 211 of the vehicle 200 has two front wheels 212 and two rear wheels 213. The front wheels 212 are driving wheels (actuating unit), and is connected to the electric rotating machine 1 via a driving shaft 214, a differential gear 216, and a driving shaft 215. The driving shaft 215 is connected to the shaft 2 (the rotor 5) of the electric rotating machine 1. The vehicle 200 also includes an engine 217. The engine 217 is connected to the electric rotating machine 1 or the driving shaft 215 via a coupling shaft 218. With such a configuration, the torque of the engine 217 and the driving power of the electric rotating machine 1 are both communicated to the front wheels 212.

Figure 29:
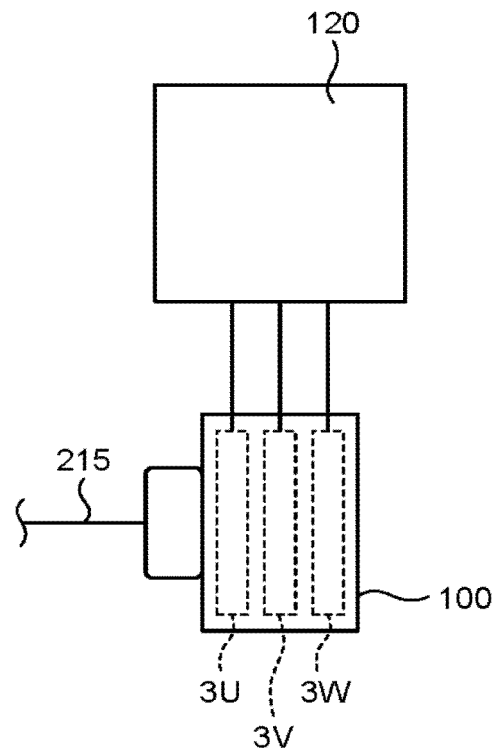
FIG. 29 is a schematic of a structure of an electric rotating machine installed in a vehicle.

FIG. 29 is a schematic of a structure of the electric rotating machine 1 installed in the vehicle 200. As illustrated in FIG. 29, the power line of the driving circuit 120 is connected to the windings of the driving elements 3U, 3V, 3W included in the electric rotating machine 1. The electric rotating machine 1 operates as a motor in an operation of driving the vehicle, and operates as a generator in an operation of power regeneration.

The vehicle 200 is not limited to a hybrid vehicle, and may be an electric vehicle without the engine 217, or a fuel cell vehicle, for example.

Application Example in Wind Power Generator

Figure 30:
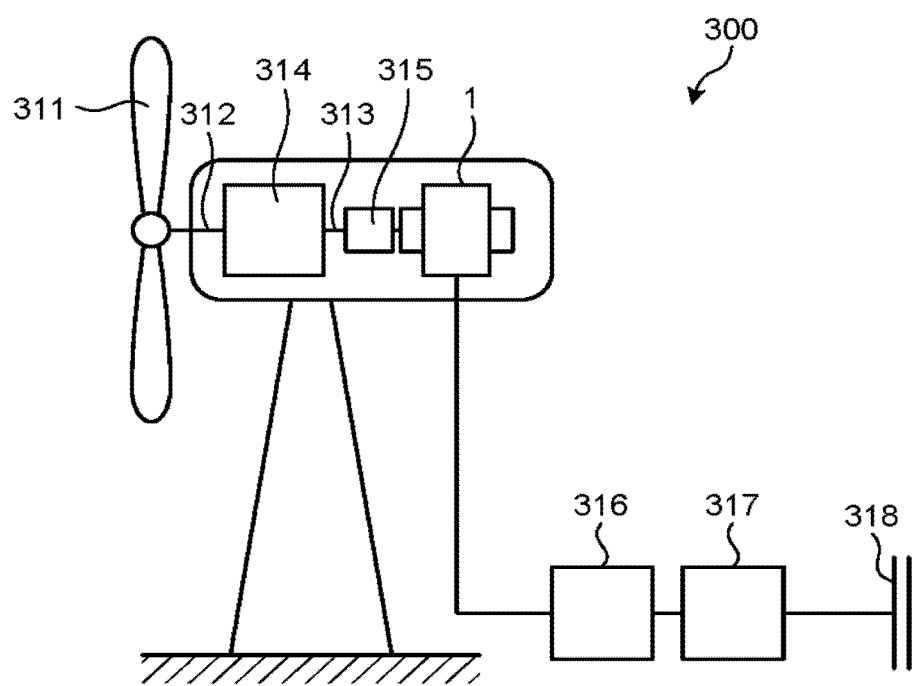
FIG. 30 is a general schematic of a structure of a wind power generator including the electric rotating machine according to the embodiment.

FIG. 30 is a general schematic of a structure of a wind power generator 300 including the electric rotating machine 1. The wind power generator 300 (machine) may include the electric rotating machine 1 according to the first embodiment. In the example illustrated in FIG. 30, blades 311 (actuating unit) of the wind power generator 300 are rotated by the force of wind, and the driving power is communicated to a speed increaser 314 via a rotating shaft 312. The driving power of the speed increaser 314 is communicated to the shaft 2 (the rotor 5) of the electric rotating machine 1 via a rotating shaft 313 and a shaft coupling 315, and the electric rotating machine 1 generates power with the driving power. The generated power is supplied to a power grid 318 via a transformer 316 and a grid protection device 317.

The electric rotating machine 1 according to the first embodiment may also be applied to any power generator other than such a wind power generator 300, e.g., a power generator a typical example of which is a hydroelectric power generator.

Application Example in Elevator

Figure 31:
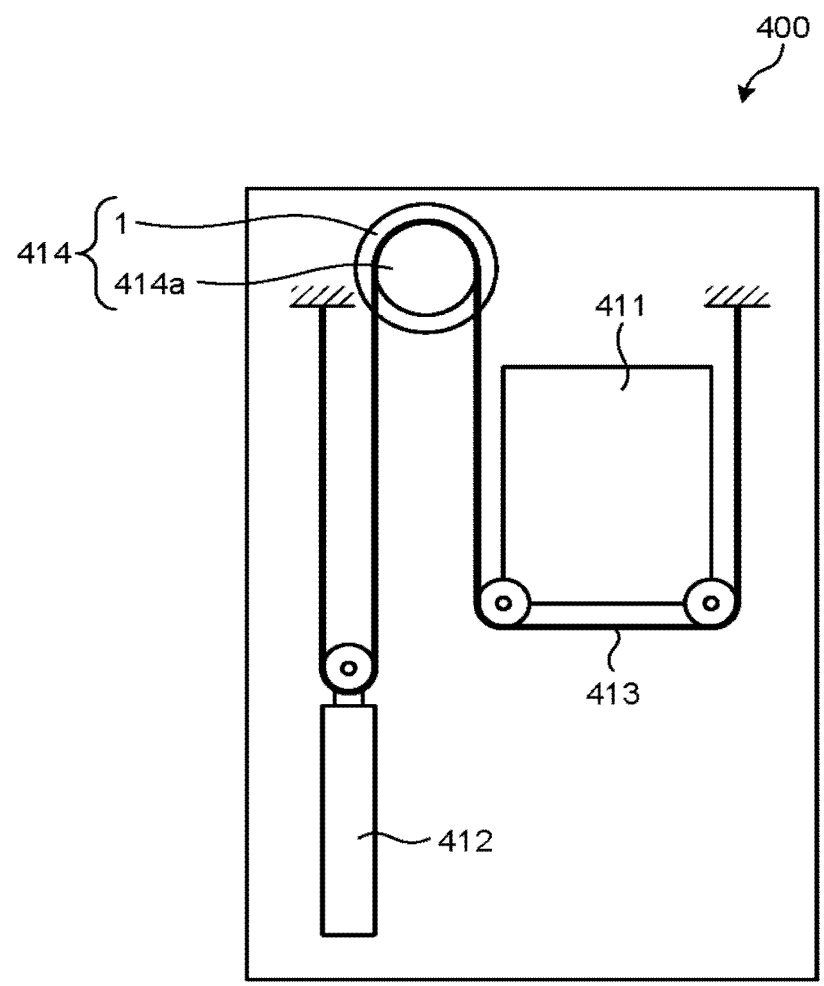
FIG. 31 is a general schematic of a structure of an elevator including the electric rotating machine according to the embodiment.

FIG. 31 is a general schematic of a structure of an elevator 400 including the electric rotating machine 1. The elevator 400 (machine) may include the electric rotating machine 1 according to the first embodiment. In the example illustrated in FIG. 31, the elevator 400 includes a hoist machine 414, a car 411 (actuating unit), a counterweight 412, and a rope 413. The hoist machine 414 includes the electric rotating machine 1 and a sheave 414a. The rope 413 is wound around pulleys installed on the car 411, the sheave 414a (actuating unit) of the hoist machine 414, and a pulley on the counterweight 412. Both ends of the rope 413 are fixed to separate positions on a building, for example. When the electric rotating machine 1 serving as a motor of the hoist machine 414 operates, the sheave 414a is rotated by the torque generated by the electric rotating machine 1. The hoist machine 414 can bring up and down the car 411 by winding up and down the rope 413, using the frictional force between the sheave 414a and the rope 413. The hoist machine 414 can also be said to be one example of the machine.

The electric rotating machine 1 according to the first embodiment may be applied to any lifting device other than the elevator 400, e.g., to a crane.

Application Example in Robot

Figure 32:
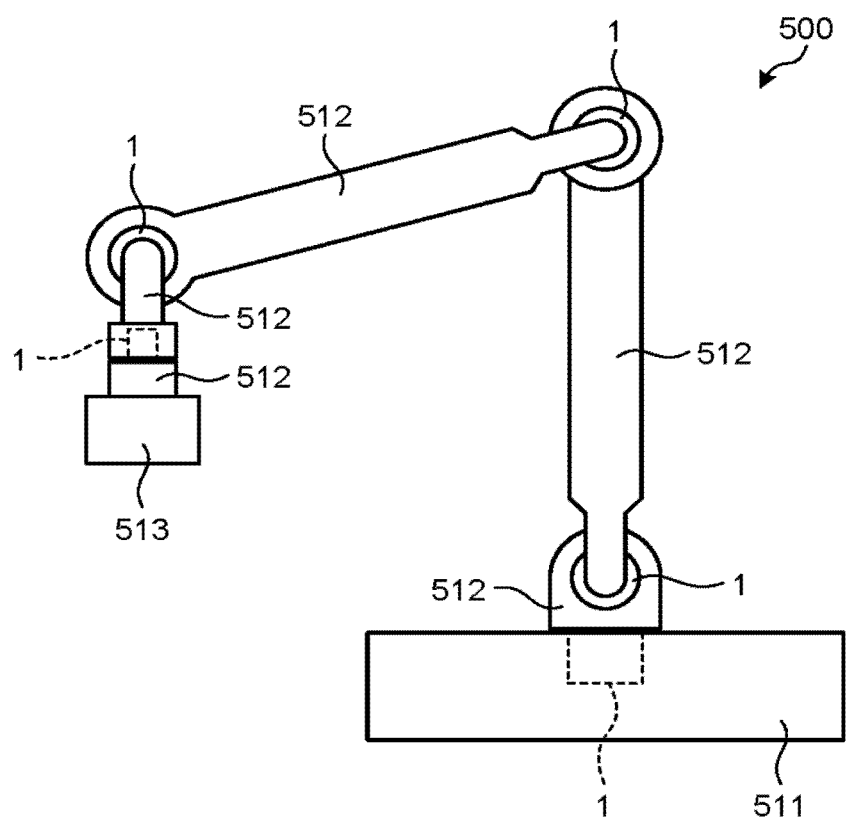
FIG. 32 is a general schematic of a structure of a robot including the electric rotating machine according to the embodiment.

FIG. 32 is a general schematic of a structure of a robot 500 including the electric rotating machine 1. The robot 500 (machine) may include the electric rotating machine 1 according to the first embodiment. In the example illustrated in FIG. 32, the robot 500 is a multi-joint robot, and includes a base 511 and a plurality of movable parts 512 (actuating unit). The electric rotating machine 1 is provided to each joint where the two movable parts 512 are movably connected. The electric rotating machine 1 is fixed to one of the movable parts 512 in the joint, and rotates the other movable part 512, relatively with respect to the one movable part 512. By controlling the electric rotating machines 1, the robot 500 can access an object 513 at some position, or convey the object by controlling a position, an orientation, and an operation (e.g., a moving speed) of the movable part 512 that is positioned at the tip of the multi-joint arm.

The electric rotating machine 1 according to the first embodiment may be applied to any robots, in general, other than the robot 500, typical examples of which are a parallel link robot, an orthogonal robot, a running (walking) robot, and an assist robot.

Furthermore, the electric rotating machine 1 according to the first embodiment may be installed in any machine other than those described above, such as machines in general, electric machines, transportation machines, and precision machines.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric rotating machine comprising:
a stator; and
a rotor that is rotatable about a rotational center, wherein the stator comprises:
    a winding having an annular shape with the rotational center;
    a first core that surrounds a part of the winding, and that has a first pole face to which a magnetic flux is input in a first direction, and a second pole face from which the magnetic flux is output in the first direction; and
    a second core that surrounds a part of the winding, and that has a third pole face to which a magnetic flux is input in a second direction, and a fourth pole face from which the magnetic flux is output in the second direction,
the second direction is opposite to the first direction,
the first core and the second core form at least a part of magnetic circuit by inputting the magnetic flux, which is output from the second pole face, to the third pole face, and by inputting the magnetic flux, which is output from the fourth pole face, to the first pole face,
the first core and the second core are integrally formed, and
the rotor is positioned spaced from the first core and the second core, and is rotatable about the rotational center, relatively with respect to the stator.

2. The electric rotating machine according to claim 1, wherein at least one of the first core and the second core has an annular portion, and a plurality of magnetic poles protruding from the annular portion.

3. The electric rotating machine according to claim 1, wherein at least one of the first core and the second core has a magnetic pole extended in a direction of a surface facing the rotor.

4. The electric rotating machine according to claim 1, wherein the rotor includes a plurality of magnets and a plurality of cores that are arranged alternatingly in a circumferential direction of the rotational center.

5. The electric rotating machine according to claim 4, wherein two magnets that are adjacent to each other with one core interposed therebetween are magnetized in opposite directions.

6. The electric rotating machine according to claim 5, wherein the magnets are magnetized in a circumferential direction of the rotational center.

7. The electric rotating machine according to claim 1, wherein the first core and the second core are a powder compact.

8. The electric rotating machine according to claim 1, wherein the first core and the second core are a steel sheet wound in a circumferential direction of the rotational center.

9. An electric rotating machine system comprising:
the electric rotating machine according to claim 1;
a driving circuit that supplies power to the electric rotating machine; and
a control unit that controls an operation of the driving circuit.

10. A vehicle comprising the electric rotating machine according to claim 1.

11. A power generator comprising the electric rotating machine according to claim 1.

12. A lifting device comprising the electric rotating machine according to claim 1.

13. A robot comprising the electric rotating machine according to claim 1.

* * * * *